U S012126626B2

United States Patent
Kumar et al.

(10) Patent No.: US 12,126,626 B2
(45) Date of Patent: Oct. 22, 2024

(54) AUTOMATIC MOBILE DEVICE MANAGEMENT (MDM) ENROLLMENT

(71) Applicant: Ivanti, Inc., South Jordan, UT (US)

(72) Inventors: Retika Kumar, Draper, UT (US); Tyler Dailey, Herriman, UT (US); Zach Durtschi, Salt Lake City, UT (US)

(73) Assignee: Ivanti, Inc., South Jordan, UT (US)

( * ) Notice: Subject to any disclaimer, the term of this patent is extended or adjusted under 35 U.S.C. 154(b) by 451 days.

(21) Appl. No.: 17/477,100

(22) Filed: Sep. 16, 2021

(65) Prior Publication Data

US 2022/0086169 A1  Mar. 17, 2022

Related U.S. Application Data

(60) Provisional application No. 63/079,838, filed on Sep. 17, 2020.

(51) Int. Cl.
*H04L 9/40* (2022.01)
*H04W 12/65* (2021.01)

(52) U.S. Cl.
CPC ............ *H04L 63/107* (2013.01); *H04L 63/20* (2013.01); *H04W 12/65* (2021.01)

(58) Field of Classification Search
CPC ...... H04L 63/107; H04L 63/20; H04W 12/65; H04W 12/069; H04W 12/55; H04W 12/77; H04W 12/37

USPC ............................................................ 726/4
See application file for complete search history.

(56) References Cited

U.S. PATENT DOCUMENTS

| 11,882,117 B1* | 1/2024 | Kumar ................ H04L 63/0876 |
| 2013/0263211 A1* | 10/2013 | Neuman ............... G06Q 20/322 726/1 |
| 2020/0045519 A1* | 2/2020 | Raleigh ............... H04M 15/765 |
| 2021/0099868 A1* | 4/2021 | Damlaj ................. H04L 67/146 |

* cited by examiner

*Primary Examiner* — Kambiz Zand
*Assistant Examiner* — Aubrey H Wyszynski

(57) ABSTRACT

A method of mobile device management (MDM) comprising scanning, by an optical reader of a first mobile device, an optical code. The optical code is generated based on a policy and a group that includes the first and a second mobile device. The optical code has encoded enrollment details of the policy. Responsive to the scanning, the method includes connecting to a computer interface on which an enrollment application is accessible and causing display of an enrollment page. The method includes receiving identification input entered into the enrollment page. In response to the identification input, the method includes automatically transferring the enrollment details and the identification input to the enrollment application. Based on the transfer, enrolling the first mobile device in a MDM system. Enrollment of the first mobile device includes enabling a set of functions of the first mobile device consistent with the policy of the group.

18 Claims, 11 Drawing Sheets

AUTOMATIC MOBILE DEVICE MANAGEMENT (MDM) ENROLLMENT

CROSS REFERENCE TO RELATED APPLICATION

This application claims the benefit of and priority to U.S. Provisional Application No. 63/079,838, filed Sep. 17, 2020, which is incorporated herein by reference in its entirety.

FIELD

The embodiments described in this disclosure are related to mobile device management (MDM) enrollment for mobile devices in managed computer networks, and in particular to automated enrollment based on optical code scans.

BACKGROUND

In enterprise and other managed networks, an endpoint refers to a computing device that is integrated into the network and that is in communication with a management device. The management device may include a server device, for instance that has visibility to operating parameters and state parameters of the endpoints. Based on information communicated between the management device and the endpoints, the management device may detect issues at the endpoints, deploy solutions to the endpoints, update software on the endpoints, troubleshoot issues at the endpoints, provision rolls and security controls to the endpoints, etc. In some managed networks, the management device may install a policy that enables a specific a set of functions. For instance, the policy may restrict access to data held in the managed network or require certain security conditions (e.g., two-part authentication) prior to obtaining access to documents.

In order to initiate the communication between the management device and the endpoint, the endpoint enrolls in the network. The enrollment enables and establishes the communication between the management device and the endpoint and may also load the policy to the endpoint, which dictates how the endpoint is managed.

In modern managed networks, the types of computing devices and the number of computing devices are increasing. In particular, the modern managed networks often include endpoints that are mobile devices (e.g., smart phones, tablet computers, etc.) of a user in addition to a workstation. The user may implement the mobile device to interface with data systems of the managed network. Additionally, mobile devices are generally more closely associated with the user and less-strictly controlled by an organization. Accordingly, mobile devices are often entry points to vulnerabilities that might be spread to the rest of the managed network. Thus, there is a need to enroll the mobile devices in endpoint management systems to ensure the mobile devices are properly managed.

In some current endpoint management systems, enrollment of mobile devices is error prone, inefficient, and difficult for the user. One source of error is manual entry of information into an enrollment interface. For example, mobile device enrollment often involves the user manually entering server information, group information, policy information, user identifiers, or combinations thereof. Failure to properly enter one or more of these pieces of information may prevent the mobile device from being enrolled. Furthermore, the information involved in enrollment must be aggregated by an administrator and disclosed to the user. In some circumstance, the information may be sensitive. For instance, the information may include naming conventions for working groups or server network locations, which an organization may want to keep confidential. Moreover, some enrollment processes are implemented by enrollment applications, which may be separately controlled. In systems implementing these enrollment processes, a user may have to separately find and download the enrollment application to a mobile device. The enrollment application may then be retained on the mobile device following enrollment.

Accordingly, there is a need in mobile device management (MDM) enrollment for an automated enrollment process that optionally limits information disclosed to a user, limits manual information entered by a user, and automatically interfaces and controls an enrollment application.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of an invention, an embodiment may include a method of mobile device management (MDM). The method may be implemented, at least partially, at a first device, which include a hardware-based computing device and configured as a management device in a managed network. The first device may be communicatively coupled to one or more mobile devices and supplementary devices via a communication network. The method may include receiving, at a first device, group selection input. The group selection input may be configured to designate two or more mobile devices of multiple mobile devices as members of a group. The members of the group may have a common attribute. For instance, the common attribute may include an enterprise role, a security assignment, a privilege to particular information, use of a software application, device access, another characteristic, or combinations thereof. The method may include assigning a policy to the group. The policy may include a set of functions to be implemented at the two or more mobile devices. For instance, the set of functions may be implemented upon enrollment of the two or more mobile devices in an MDM system. The set of functions include one or more functions related to data, software, user access, or another parameter of a management system or a mobile device. The set of functions may include, for instance, a use restriction related to a particular software, an access restriction related to data, a privilege relative to a particular software, or some combination thereof. The method may include setting a security feature of an enrollment page. The security feature may include a security feature such as a control of disclosure of a characteristic assigned to the group. The characteristic assigned to the group may include some information related to the management system or related to at least a portion of an organization implementing the management system such as a group name and/or a server associated with the group. Additionally, the control of disclosure may include an option to display the characteristic in an enrollment page or an enrollment interface. The method may include generating an optical code. The optical code may be based on information related to a mobile device, the organization, a specific role or function of a mobile device, a role of a user of the mobile device, other relevant information, or combinations thereof. For instance, the optical code may be based on the policy and the group such as information configured, upon execution, to support enrollment of the two or more mobile devices into the MDM system according to the policy assigned to the group. The optical code may be configured such that a scan by the optical reader automatically submits one or more enrollment details into the enrollment application. Additionally or alternatively, the optical code may be configured to interface with a local agent at the two or more mobile devices. Additionally or alternatively, the optical code may have encoded therein information that upon execution of the optical code is configured to connect the two or more mobile devices with a computer interface on which an enrollment application is accessible. A connection of the two or more mobile devices with the computer interface on which the enrollment application is accessible may be based on an operating system on a mobile device and/or may be based on whether an enrollment application is loaded onto the mobile device. For instance, the connection may include launch of an app clip associated with the enrollment application. The app clip may direct a user to an enrollment page responsive to a first operating system being loaded on the first mobile device. The connection may include launch of the enrollment application on which the enrollment page is displayed responsive to a second operating system and the enrollment application being loaded on the first mobile device. The connection may include launch of an application distribution platform on which the enrollment application is available responsive to the second operating system being loaded on the first mobile device and the enrollment application not being loaded on the first mobile device. The enrollment application may be configured to only receive identification input in addition to the enrollment details submitted by scanning the optical code to enroll a first mobile device into the MDM system. The identification input may include a user identifier and a password. The method may include customizing an aspect of the optical code. The optical code may be customized based on received input. The aspect of the optical code that is customized may be configured to facilitate identification of a source of the optical code without effecting a functional parameter of the optical code. The method may include communicating an enrollment invitation. The enrollment invitation may be communicated to two or more supplementary devices. The supplementary device may each be associated with a user of one of the two or more mobile devices. The enrollment invitation may include the optical code. The enrollment invitation may enable the optical code to be displayed on a screen associated with the supplementary devices. The method may include enrolling a first mobile device of the two or more mobile devices in the MDM system. Enrollment of the first device may be responsive to receipt of a read signal. The read message may indicate that the optical code has been scanned by an optical reader of the first mobile device. The read signal may further indicate that the user identifier and the password is entered at the first mobile device. The optical code may be displayed on the screen of the supplementary device associated with the user of the first mobile device when it is scanned. The enrollment of the first mobile device may include enabling the set of functions relative to the first mobile device in the MDM system. The method may include removing the enrollment application. For instance, the enrollment application may be removed from the first device following enrollment of the first device in the MDM system. The group may be a first group, the policy may be a first policy, the set of functions may be a first set of functions, the optical code may be a first optical code, and the enrollment invitation may be a first enrollment invitation. In these and other circumstance, the method further comprises receiving a second group selection. The second group selection may be received at the first device. The second group selection may designate two or more additional mobile devices of the multiple of mobile devices as members of a second group. The method may include assigning a second policy to the second group. The second policy may include a second set of functions implemented at the two or more additional mobile devices upon enrollment of the two or more additional mobile devices in the MDM system. The method may include generating a second optical code. The second optical code may be based on the second policy and the second group among other factors. The optical code may be configured to connect the two or more additional mobile devices with the computer interface on which the enrollment application is accessible. The optical code may be further configured, upon execution, to support enrollment of the two or more additional mobile devices into the MDM system according to the second policy assigned to the second group. The first set of functions includes at least one function that is not included in the second set of functions.

Another aspect of an embodiment may include method of MDM. The method may be implemented, at least partially, at a first mobile device, which include a hardware-based computing device and being enrolled in a managed network. The first mobile device may be communicatively coupled to one or more additional mobile devices and a management device via a communication network. The method may include scanning an optical code. The optical code may be scanned by an optical reader of a first mobile device. The optical code may be generated based on a policy and a group in which the first mobile device is included with a second mobile device. The optical code may have encoded therein enrollment details associated with the policy. The first mobile device and the second mobile device may be included in multiple mobile devices associated with an entity and/or communicatively coupled to a server device. The first mobile device and the second mobile device may be designated as members of the group based on selection input received at the server device. The first mobile device and the second mobile device have a common attribute wherein the common attribute includes an enterprise role, a security assignment, a privilege to particular information, use of a software application, or device access. The policy may define the set of functions to be implemented by the members of the group upon enrollment in the MDM system. The optical code may be included in an enrollment invitation, which may be communicated by the server device to the supplementary device. The optical code may be displayed on a screen of the supplementary device associated with a user of the first mobile device when the optical code is scanned. The optical code may be configured to interface with a local agent at the first mobile device. One or more aspects of the optical code may be customized to facilitate identification of a source of the optical code without effecting a functional parameter of the optical code. The method may include connecting to a computer interface. The computer interface may include a webpage or another computer interface on which an enrollment application is accessible. Connection to the computer interface may be responsive to the scanning of the optical code. A connection to the computer interface on which the enrollment application is accessible may be based on an operating system on a mobile device and/or may be based on whether an enrollment application is loaded onto the mobile device. For instance, the connection may include launching an app clip associated with the enrollment application. The app clip may direct a user to the enrollment page. Launch of the app clip may be responsive to a first operating system being loaded on the first mobile device. The connection may include launching an enrollment application on which the enrollment page is displayed responsive to a second operating system and the enrollment application being loaded on the first mobile device. The connection may also include launching an application distribution platform on which the enrollment application is available responsive to the second operating system being loaded on the first mobile device and the enrollment application not being loaded on the first mobile device. The enrollment application may be configured to only receive identification input in addition to the enrollment details embedded in the optical code to enroll the first mobile device into the MDM system. The method may include causing display of an enrollment page. The enrollment page may be displayed on an enrollment page on a screen of the first mobile device. The method may include receiving identification input entered into the enrollment page. The identification input may include information used to verify an identity of a user such as a user identifier and a password. Disclosure of a characteristic assigned to the group may be controlled by a security feature setting applied to the enrollment page. The characteristic assigned to the group may include, for example, a group name or a server associated with the group. Control of disclosure of the characteristic may include an option to display the characteristic (e.g., the group name or the server) in the enrollment page. The method may include automatically transferring data and information to the enrollment application. The data and information may include the enrollment details and the identification input to the enrollment application. The transferring of the data and information may be in response to receipt of the identification input. The method may include enrolling the first mobile device in an MDM system. Enrollment of the first mobile device may be based on the transfer of the enrollment details and the identification input. The enrollment of the first mobile device may include enabling a set of functions of the first mobile device in the MDM system consistent with the policy assigned to the group. The set of functions include one or more functions related to data, software, user access, or another parameter of a management system or a mobile device. The set of functions may include, for instance, a use restriction related to a particular software, an access restriction related to data, a privilege relative to a particular software, or some combination thereof. The method may include communicating a read signal. The read signal may indicate that the optical code has been scanned. The read signal may be communicated to a server device. The read signal further indicates that the user identifier and the password is entered at the first mobile device. The method may include removing the enrollment application. The enrollment application may be removed from the first mobile device after enrollment of the first mobile device in the MDM system.

A further aspect of an embodiment may include non-transitory computer-readable medium having encoded therein programming code executable by one or more processors to perform or control performance of one or more of the operations of the methods described above.

An additional aspect of an embodiment may include compute device comprising one or more processors and a non-transitory computer-readable medium having encoded therein programming code executable by one or more processors to perform or control performance of one or more of the operations of the methods described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Embodiments of the present disclosure relate to enrollment of mobile devices into a managed network and mobile device management (MDM) systems. Some embodiments describe an improved enrollment process that involves generation and scanning of an optical code. The optical code is embedded with enrollment details involved in the enrollment of a mobile device. The enrollment details are automatically transferred during an enrollment process. Additionally, the optical code is embedded with information to connect the mobile device to a computer interface associated with an enrollment application. The connection between the mobile device and the computer interface is based on an operating system and/or an application loaded on the mobile device. In addition, some embodiments of the enrollment processes described herein enable an administrator to determine or set disclosure settings regarding the enrollment details. Accordingly, some embodiments of the present disclosure provide a technical solution to improve mobile device enrollment processes as described below.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

Figure 1:
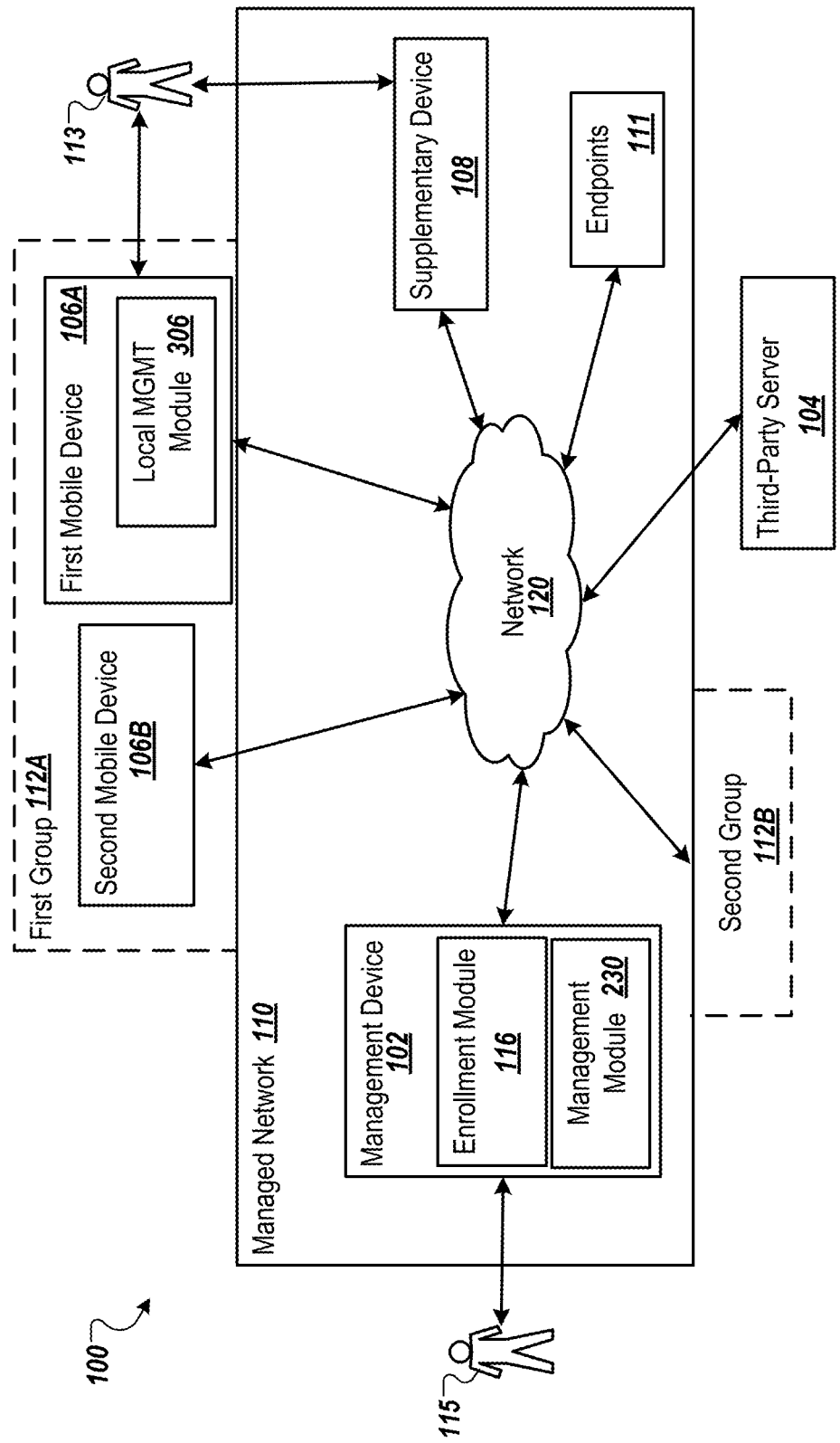
FIG. 1 depicts a block diagram of an example operating environment.

FIG. 1 is a block diagram of an example operating environment 100 in which some embodiments of the present invention can be implemented. The operating environment 100 includes a managed network 110, a third-party server 104, a first group 112A, and a second group 112B (generally, group 112 or groups 112) that are communicatively coupled by a network 120. In the operating environment 100, the managed network 110 is implemented to manage devices such as mobile devices 106A and 106B (generally mobile devices 106 or mobile devices 106), endpoints 111, supplementary devices 108, or combinations or subsets thereof. The managed network 110 is an example of or may include a mobile device MDM system.

To implement the managed network 110, devices such as the mobile devices 106 are enrolled in the managed network 110. After a device is enrolled, ongoing management of the mobile devices 106 may be implemented. The ongoing management may include overseeing and dictating at least a part operations at the devices that have been enrolled. For instance, once the mobile devices 106 are enrolled, a management device 102 may oversee operations at the mobile device 106 as well as dictate and control access to enterprise applications and enterprise data.

Enrollment and management of mobile devices 106 may be important to the technical field of endpoint management (EPM) and managed enterprise networks. For instance, the mobile devices 106 are increasing used to access enterprise applications and enterprise data. Accordingly, an enterprise associated with the managed network 110 may benefit from enrollment and management of the mobile devices 106 to prevent or reduce misuse of the enterprise applications, introduction of vulnerability into a remaining portion of an enterprise network, risk to enterprise data, etc.

In conventional managed networks similar to the managed network 110, enrollment of mobile devices 106 may be resource intensive, insecure, and inefficient. For example, in some conventional managed networks, to enroll a mobile device, a user (similar to a user 113) may download and load an enrollment application. The user may then be presented with some group and network information pertaining to a group that includes the mobile device. The user may then enter the group and network information as well as provide personal information to identify herself. The information entered into the enrollment application may then be processed at a management device to complete enrollment and initiate management of the mobile device.

In these conventional processes, enrollment information that relates the mobile devices to the management device are not securely controlled. The enrollment information may provide visibility to an underlying network structure and enterprise organizational information. Accordingly, the availability of such information may introduce a vulnerability to an enterprise associated with a manage network. Additionally, these conventional enrollment processes might lead to enrollment errors. For instance, the enrollment information can be erroneously entered into an enrollment page. Such erroneous entry may admit the mobile device into an incorrect group, which may apply an incorrect policy to management of the mobile device. Moreover, errors in entry may cause frustration of the user, which may lead to the user not enrolling the mobile device.

Additionally still, in conventional MDM enrollment systems mobile devices may be running various operating systems and applications. For instance, in some enterprise networks, mobile devices are owned by employees. The employee has control over the operating system and applications on her device. Thus, it may be difficult for an MDM enrollment system to implement a single solution that is effective to enroll devices with different operating systems and different applications.

Accordingly, embodiments of the present disclosure describe systems and methods for improved enrollment of the mobile devices 106 into the managed network 110. The improved enrollment uses optical codes that are executed by the mobile devices 106 to automate steps in the enrollment process, to support communication of at least a portion of enrollment information, and to interface is multiple operating systems and multiple application states at the mobile devices 106. For instance, in some embodiments, the optical codes are generated by the management device 102. The optical codes are embedded with enrollment details that are specific to the mobile devices 106 or to a specific group (e.g., a first group 112A or a second group 112B) of the managed network 110. Scanning of the optical code may initiate automatic communication of the enrollment details without action by the user 113. The optical codes may obscure the enrollment details from the user 113 while removing one of the primary sources of enrollment error. Thus, the improved enrollment using the optical code reduces visibility of the enrollment information such that the vulnerability related to the enrollment information is decreased. Additionally, the improved enrollment using optical codes reduces steps taken by a user 113 to complete enrollment, which reduces enrollment errors and increases the number of mobile devices that are actively managed in the managed network 110.

In some embodiments, the optical code has embedded information related to enrollment application launch (launch information). The launch information may automate one or more steps related to accessing an enrollment application. For instance, the optical code may automatically direct the mobile device 106 to the enrollment application or an app clip associated with the enrollment application. Additionally, the enrollment application may be removed following enrollment to reduce a number of applications on the mobile devices 106 and eliminating the dedication of computing resources to unused applications. The launch information also allows the use of one optical code with each or all of the mobile devices 106. For instance, a first mobile device 106A may have a first operating system and a second mobile device 106B may have a second operating system. The launch information enables enrollment of both mobile devices 106 using the same optical code by connecting the mobile device 106 to different computing interfaces based on the operating system and/or applications.

Accordingly, embodiments of the present disclosure are directed to a computer-centric problem and are implemented in a computer-centric environment. For instance, the embodiments of the present disclosure are directed to management networks and computing processes occurring on the mobile devices 106 and the management device 102. Communications during the processes described in this present disclosure involve the communication of data in electronic and optical forms via the network 120 and involve the electrical and optical interpretation of the data.

Furthermore, the embodiments of the present disclosure address a technical issue that exist in a technical environment. For example, some embodiments address network vulnerabilities introduced into the managed network 110 as well as describe a process involving computing devices accessing and communicating electronic information. The technical problem is solved through a technical solution. For instance, an optical code is embedded with information that upon execution causes computer devices to automatically access and/or launch enrollment applications as well as automatically enter some portion of the embedded information into an enrollment page.

Referring to FIG. 1, the operating environment 100 may include the managed network 110, the third-party server 104, and the groups 112. The managed network 110 includes the management device 102, a supplementary device 108, and endpoints 111. The first group 112A includes the mobile devices 106. The components of the operating environment are configured to communicate via the network 120 to perform enrollment processes described in the present disclosure. Additionally, following enrollment of one of the mobile devices 106, management of the mobile device 106 may involve communications via the network 120 in the operating environment 100. Each of these components are described below.

The network 120 may include any communication network configured for communication of signals between the components (e.g., 102, 108, 111, 104, and 106) of the operating environment 100. The network 120 may be wired or wireless. The network 120 may have configurations including a star configuration, a token ring configuration, or another suitable configuration. Furthermore, the network 120 may include a local area network (LAN), a wide area network (WAN) (e.g., the Internet), and/or other interconnected data paths across which multiple devices may communicate. In some embodiments, the network 120 may include a peer-to-peer network. The network 120 may also be coupled to or include portions of a telecommunications network that may enable communication of data in a variety of different communication protocols.

In some embodiments, the network 120 includes or is configured to include a BLUETOOTH® communication network, a Z-Wave® communication network, an Insteon® communication network, an EnOcean® communication network, a Wi-Fi communication network, a ZigBee communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 120 may include data communicated via short messaging service (SMS), multimedia messaging service (MMS), hypertext transfer protocol (HTTP), direct data connection, wireless application protocol (WAP), or any other protocol that may be implemented in the components of the operating environment 100.

In the embodiment of FIG. 1, the groups 112 represent one or more mobile devices (e.g., the mobile devices 106) that are not part of the managed network 110, however the management device 102 is configured to implement an enrollment process to enroll the groups 112 into the managed network 110. Following the enrollment process, mobile devices 106 in the groups 112 may become part of the managed network 110.

The third-party server 104 includes a hardware-based computer device or collection thereof that is configured to communicate with the other components of the operating environment 100 via the network 120. The third-party server 104 is configured to provide access to an enrollment application. For instance, the third-party server 104 may host a computer interface such as an application distribution platform on which the enrollment application is available. Additionally or alternatively, the third-party server 104 may enable access to an app clip associated with the enrollment application. Some examples of the application distribution platform provided by the third-party server 104 may include Apple® Appstore, Google Play®, Huawei® App Store, Amazon® Appstore, or another suitable computer interface.

The managed network 110 includes the management device 102, the supplementary device 108, and the endpoints 111. The management device 102 is configured to manage the supplementary devices 108 and the endpoints 111 included in the managed network 110. Additionally, the management device 102 is configured to enroll the devices (e.g., the mobile devices 106) in the groups 112. Following enrollment, the devices is groups 112 may be managed as the endpoints 111 and the supplementary devices 108.

The supplementary device 108 may include hardware-based computer devices that are configured to communicate with the other components of the operating environment 100 via the network 120. The supplementary device 108 may be associated with a user 113. For instance, the user 113 may regularly use the supplementary device 108 and/or the management device 102 may designate the user 113 as the individual who regularly uses the supplementary device 108. The supplementary device 108 generally includes a screen or a display device suitable to display information. Accordingly, a message transmitted to the user 113 may be communicated to the supplementary device 108. Contents of the message may then be viewed by the user 113 on the supplementary device 108.

In the depicted embodiment, the supplementary device 108 is part of the managed network 110. Accordingly, the supplementary device 108 is substantially similar to and may be characterized as one of the endpoints 111 managed by the management device 102. In some embodiments, the supplementary device 108 may not be part of the managed network 110. In these and other embodiments, the supplementary device 108 may be a public computer terminal or another computing system with which the user 113 interfaces.

The endpoints 111 may include hardware-based computer systems that are configured to communicate with the other components of the operating environment 100 via the network 120. The endpoints 111 may include any computer device that may be managed by the management device 102 and have been enrolled in the managed network 110. Generally, the endpoints 111 include devices that are operated by the personnel and systems of an enterprise or store data of the enterprise. The endpoints 111 might include workstations of an enterprise, servers, data storage systems, printers, telephones, internet of things (IOT) devices, smart watches, sensors, automobiles, battery charging devices, scanner devices, etc.

The management of the endpoints 111 ensures that the endpoints 111 are operated according to a policy. The policy may enable a set of functions that dictate or restrict how one or a group of the endpoints 111 are used. The set of functions may further dictate software applications implemented on the endpoints, particular functions of the software applications, restrictions regarding network security, particular roles of users associated with the endpoints 111, etc. For instance, the set of functions may restrict access to confidential data by one of the endpoints 111 while the endpoint is on a public network.

The managed network 110 may have multiple policies. One of the policies may be assigned to groups 112 of the endpoints 111 and to the devices (e.g., 106) of the groups 112. For instance, devices in the groups 112 may have a common attribute, which may determine the types of restrictions that are appropriate for the group 112 of endpoints 111. During some embodiments of the enrollment processes, an appropriate policy may be assigned to the first group 112A or the second group 112B. Again, the assignment of the policy to the groups 112 may be based on the common attribute of the group 112.

The mobile device 106 includes a hardware-based computer device that is configured to communicate with the other components of the operating environment 100 via the network 120. Some examples of the mobile device 106 may include a smartphone or a tablet personal computer. Additionally, one or more enrollment processes described in the present disclosure may be implemented in other network-enabled devices that include or may be interfaced with an optical scanner or cameras. Some examples of network-enabled devices may include printers, IOT devices, sensors, barcode scanners, etc.

The first mobile device 106A may be associated with the users 113 who is also associated with the supplementary device 108. Accordingly, the user 113 be able to access and operate both the supplementary device 108 and the first mobile device 106A. For instance, the user 113 may operate the supplementary device 108 to display the optical code and concurrently operate the first mobile device 106A to scan the optical code displayed on the supplementary device 108.

The mobile devices 106 may be configured for enrollment into the managed network 110. Enrollment into the managed network 110 may enable communications and setting modifications of systems on the mobile devices 106 by the management device 102. For instance, following enrollment, the management device 102 or the management module 230 may communicate commands to a local management module 306 of the first mobile device 106A. The commands may be received at the mobile devices 106 and implemented locally. Local implementation of the commands may alter a setting and/or a state of a system or component operating on the mobile devices 106. For instance, the commands may change a security setting of the mobile device 106 (e.g., requiring two-part authentication for an email account), update or deploy a software application at the mobile device 106, enable or disable a hardware component (e.g., a camera or microphone), request or access information related to use of the mobile device 106, or any combination thereof.

In some embodiments, the local management module 306 may be implemented as a local agent. The local agent may implement administrative and/or management processes within the managed network 110.

Although not depicted in FIG. 1, one or more of the endpoints 111 and/or the supplementary device 108 may include the local management module 306. In these and other embodiments, management services provided by the management device 102 may be implemented through communication of signals between the management module 230 and the local management modules 306 of the endpoints 111 and supplementary device 108.

The management device 102 may include hardware-based computer system that is configured to communicate with the other components of the operating environment 100 via the network 120. The management device 102 may be associated with an administrator 115. The administrator 115 may be an individual, a set of individuals, or a system that interfaces with the management device 102. In some embodiments, the administrator 115 may be provide input to the management device 102. The input provided by the administrator 115 may form the basis of some computing processes performed by the management device 102. For example, the administrator 115 may provide group selection input, security selection input, and code customization input to the management device 102. The group selection input may determine how devices and endpoints 111 are grouped in the managed network 110. The security selection input may determine what information is visible to the user 113 during an enrollment process. The code customization input may determine a look of an optical code output by the management device 102.

The management device 102 may include a management module 230. The management module 230 may be configured to manage the endpoints 111. For instance, the management module 230 may be configured to monitor the endpoints 111 and enforce the policy of the endpoints 111. The management module 230 may be configured to allow changes to the policy, grouping of the endpoints 111 and devices of the groups 112 in some embodiments.

The management device 102 may include an enrollment module 116. The enrollment module 116 may be configured to perform one or more MDM enrollment processes as described in the present disclosure. For instance, the enrollment module 116 may be configured to enroll the first mobile device 106A of the first group 112A into the managed network 110.

For example, in some embodiments, the enrollment module 116 may receive the group selection input. Based on the group selection input, the enrollment module 116 may designate the first and second mobile devices 106 as members of the first group 112A. The enrollment module 116 or the management module 230 may assign a policy to the first group 112. The policy may include a set of functions to be implemented at the mobile devices 106 following enrollment in the managed network 110. The enrollment module 116 may generate an optical code based at least partially on the policy and/or the group. The optical code may have encoded therein information that upon execution of the optical code is configured to connect the mobile devices 106 with the computer interface of the third-party server 104. Additionally, the optical code may have embedded therein enrollment information to support enrollment of the mobile devices 106 into the manage network 110 according to the policy assigned to the group.

The enrollment module 116 may communicate an enrollment invitation to the supplementary device 108 associated with the user 113. The enrollment invitation includes the optical code such that the optical code is displayable on a screen associated with the supplementary device.

The mobile device 106 may scan the optical code. For instance, the mobile device 106 may include an optical reader and associated software for scanning optical codes. Some examples of suitable associated software might include "QR READER for iPHONE by TapMedia Ltd., QR CODE READER by TinyLab, or another suitable optical scanning software. In some embodiments, the optical code may be displayed on a screen or display associated with the supplementary device 108 when it is scanned.

Responsive to the scanning of the optical code, the first mobile device 106A may be connected to a computer interface of the third-party server 104. The enrollment application may be launched on the mobile device 106 or the first mobile device may be directed to a platform on which the enrollment applications is accessible. The connection may be based on an operating system and/or presence of the enrollment application at the mobile device 106.

Also, responsive to the scanning of the optical code, display of an enrollment page on a screen of the first mobile device 106A may be caused. The user 113 may then enter information such as identification input into the enrollment page.

In response to receipt of the identification input, the first mobile device may automatically transfer enrollment details embedded in the optical code and the identification input to the enrollment application. Based on the transfer of the enrollment details and the identification input, the first mobile device 106A may be enrolled in the managed network 110.

In some embodiments, the enrollment module 116 may enroll the first mobile device 106A in the managed network 110 responsive to receipt of a read signal. The read signal may indicate that the optical code has been scanned by an optical reader of the first mobile device 106A. Additionally, the read signal may indicate that identification input of the user 113 has been received at an enrollment page. Enrollment of the mobile device 106 includes enabling the set of functions of the policy relative to the first mobile device 106A in the managed network 110. In some embodiments, after enrollment, the enrollment application is removed from the first mobile device 106A.

Enrollment may be substantially similar for the second mobile device 106B. In some embodiments, the optical code scanned by the second mobile device 106B may be substantially similar or identical to the optical code scanned by the first mobile device 106A. The optical code may be substantially similar even if enrollment of the first mobile device 106A involves an enrollment app clip and enrollment of the second mobile device 106B involves directing the second mobile device 106B to an application platform where the enrollment application was downloaded.

The managed network 110 may be associated with an enterprise, a portion of an enterprise, a government entity, or another entity or set of devices (106, 111, or 108). In some embodiments, the management device 102 may be one server, a virtual device, or a virtual server in a cloud-base network of servers. In these and other embodiments, one or both of the modules 116 and 230 may be spread over two or more cores, which may be virtualized across multiple physical machines.

The enrollment module 116, the management module 230, the local management module 306, and components thereof may be implemented using hardware including a processor, a microprocessor (e.g., to perform or control performance of one or more operations), a field-programmable gate array (FPGA), or an application-specific integrated circuit (ASIC). In some other instances, enrollment module 116, the management module 230, the local management module 306, and components thereof may be implemented using a combination of hardware and software. Implementation in software may include rapid activation and deactivation of one or more transistors or transistor elements such as may be included in hardware of a computing system (e.g., the mobile devices 106 or the management device 102 of FIG. 1). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. For example, the operating environment 100 may include one or more managed networks 110, one or more management devices 102, one or more supplementary devices 108, one or more endpoints 111, one or more third-party servers 104, two or more groups 112, or any combination thereof. Moreover, the separation of various components and devices in the embodiments described herein is not meant to indicate that the separation occurs in all embodiments. Moreover, it may be understood with the benefit of this disclosure that the described components and servers may generally be integrated together in a single component or server or separated into multiple components or servers.

Figure 2:
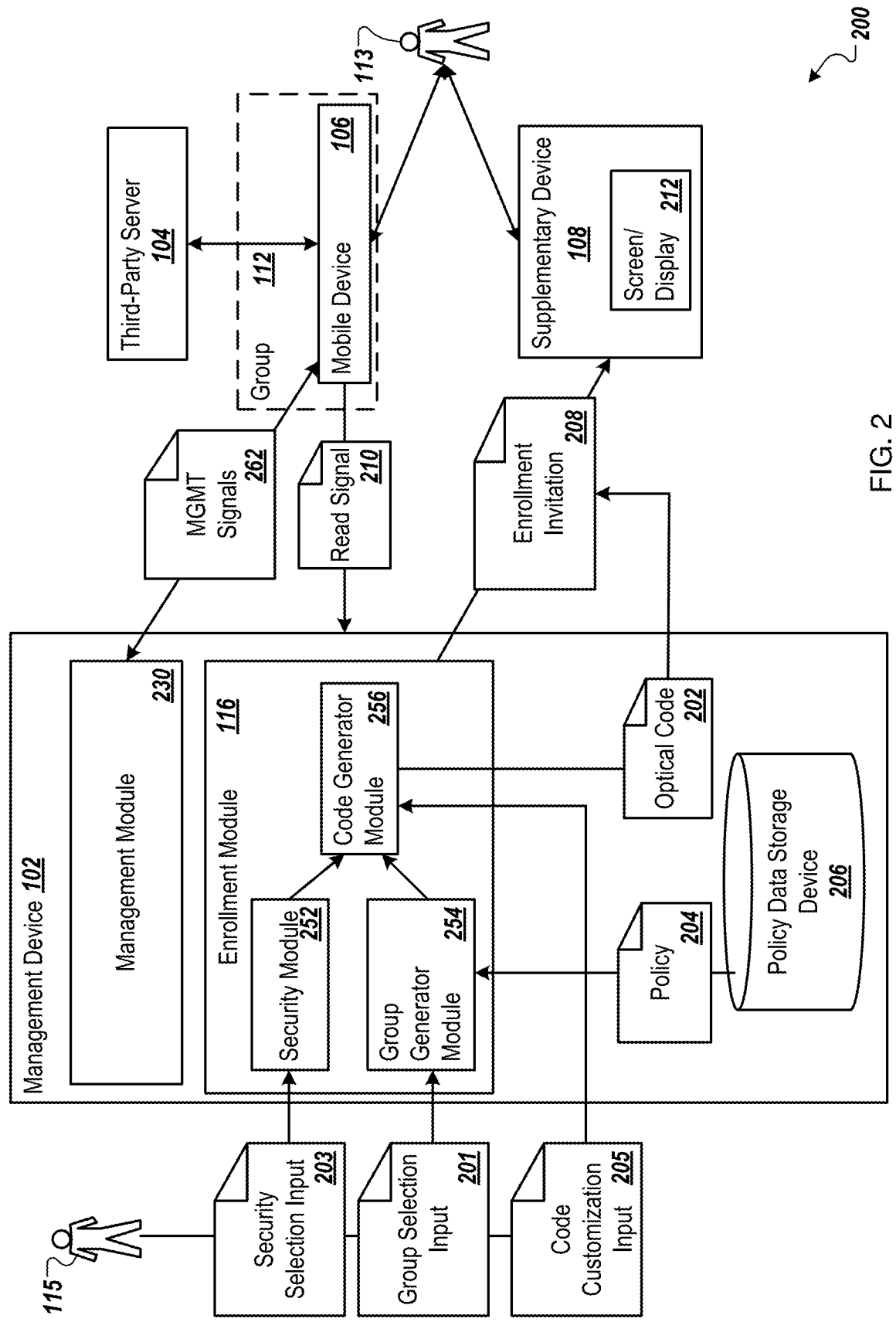
FIG. 2 depicts a block diagram of a first enrollment process that may be implemented in the operating environment of FIG. 1.

FIG. 2 depicts a first example enrollment process 200 (first enrollment process 200) that may be implemented in the operating environment 100 of FIG. 1 or another suitable environment. The first enrollment process 200 includes some components (e.g., the mobile device 106, the group 112, the supplementary device 108, the management device 102, the third-party server 104, the user 113, and the administrator 115) described with reference to FIG. 1. The network 120 of FIG. 1 is omitted from FIG. 2. However, it may be understood with the benefit of the present disclosure that information and data may be communicated in the first enrollment process 200 via the network 120 of FIG. 1 or another suitable communication network.

The first enrollment process 200 of FIG. 2 may be implemented at least partially by the management device 102 that includes the management module 230 and the enrollment module 116. The management device 102, the management module 230, and the enrollment module 116 are introduced with reference to FIG. 1. The enrollment module 116 may further include a group generator module 254, a security module 252, and a code generator module 256. The group generator module 254 may receive group selection input 201 from the administrator 115. The group selection input 201 may designate one or more devices such as the mobile devices 106 (only one mobile device depicted in FIG. 2) as members of the group 112. The designation of the mobile devices 106 as members of the group 112 may be based common attribute that is shared by the mobile devices 106. For instance, the common attribute may include an enterprise role, a security assignment, a privilege to particular information, use of a software application, device access, another characteristic, or combinations thereof. The group selection input 201 may be entered into a user interface that may be configured to discover devices such as the mobile device 106. The group selection input 201 may then identify which of the discovered devices include the common attribute and are accordingly assembled into the first group 112.

Additionally, the group generator module 254 may interface with a policy data storage device 206. Information and data related to policies implemented by the management device 102 may be stored in the policy data storage device 206. For instance, one or more sets of functions that dictate and restrict operations of endpoints (e.g., the endpoints 111) and the mobile device 106 following enrollment may be stored in the policy data storage device 206.

The group generator module 254 may assign a policy 204 to the first group 112. The policy 204 may include a set of functions to be implemented relative to the mobile device 106. For instance, the set of functions may be implemented upon enrollment of the mobile device 106 in a managed network or an MDM system.

The set of functions may include one or more functions related to data access, software, user access, or another parameter of a management system or a mobile device. For instance, the set of functions may include a use restriction related to a particular software, an access restriction related to data such as confidential enterprise data, a privilege relative to a particular software, or some combination thereof. The group generator module 254 may communicate signals indicative of the members of the group 112 and policy data indicative of the policy 204 to a code generator module 256.

The security module 252 of the enrollment module 116 may receive security selection input 203 from the administrator 115. The security selection input 203 may be implemented to set or determine a security feature used in the first enrollment process 200. For instance, the security selection input 203 may set the security feature of an enrollment page. In some embodiments, the security feature may include control of disclosure of one or more characteristics assigned to the first group 112 such as an option to display the characteristic in the enrollment page or an enrollment interface. The characteristic assigned to the group may include information related to the management system or related to at least a portion of an organization implementing the management device 102 such as a group name, cloud security alliance (CSA) information, a server associated with the first group 112, or some combination thereof.

For example, the administrator 115 may not want to disclose enrollment information related to the first group 112. Accordingly, the administrator 115 may provide security selection input 203 to a user interface related to enrollment security. The security selection input 203 may be communicated to the security module 252. The security module 252 may receive the security selection input 203 and generate a signal that prevents the enrollment information from being displayed to the user 113 on the enrollment page. The security module 252 may communicate the signal to the code generator module 256.

The code generator module 256 may be configured to generate an optical code 202. The optical code 202 may include an image or pattern that is readable by an imaging device such as a camera or an optical scanner. Some examples of the optical code 202 may be a one dimensional or a two-dimensional barcode such as a quick response (QR) code, a micro QR code, a JAB code, a Code 128 barcode, a combination thereof, or another suitable code.

In general, the optical code 202 may be generated to embed information related to enrollment of the first mobile device 106. For instance, the information embedded in the optical code 202 may include data related to the first mobile device 106, an organization or enterprise implementing the management device 102, a specific role of the first mobile device 106, a role of the user 113, other relevant information, or combinations thereof. In particular, in the depicted embodiment, the optical code 202 may have embedded therein information based on the policy 204, which is assigned to the first group 112 and the signals generated by the security module 252 regarding the security feature.

The information embedded on the optical code 202 support enrollment of the mobile device 106 into an MDM system according to the policy 204 assigned to the first group 112. For instance, the information embedded in the optical code 202 may connect the mobile device 106 to a computer interface of the third-party server 104. Additionally or alternatively, the information embedded in the optical code 202 includes enrollment information or enrollment details that may be automatically entered and communicated to an enrollment application accessed at the third-party server 104.

The code generator module 256 may be configured to customize one or more aspects of the optical code 202. For instance, the code generator module 256 may be configured to receive code customization input 205 from the administrator 115. The aspect(s) of the optical code 202 that is customized may be configured to facilitate identification of a source of the optical code 202 (e.g., the enterprise or organization) without effecting a functional parameter of the optical code 202. For instance, the optical code 202 may be generated such that a scan by an optical reader of the mobile device 106 automatically submits one or more enrollment details into the enrollment application. The aspects customized by the code customization input 205 would not affect the automatic submission of the enrollment details responsive to the scan of the optical code 202. Similarly, the optical code 202 may have encoded therein information that in response to execution (e.g., being scanned) is configured to connect the mobile device 106 with a computer interface on which the enrollment application is accessible. The aspects customized by the code customization input 205 would not affect a connection between the mobile device 106 and the computer interface.

The enrollment module 116 may be configured to communicate an enrollment invitation 208 to the supplementary device 108. The supplementary device 108 may be associated with the user 113 of the first mobile device 106. Additionally, the supplementary device 108 may include or be interfaced with a screen or display device 212 (in FIG. 2, "screen/display" 212).

The enrollment invitation 208 may include the optical code 202 or may provide a link (e.g., a hyperlink) to the optical code 202. In some embodiments, the enrollment invitation 208 may include the customized version of the optical code 202. Accordingly, based on the customized features, the user 113 who receives the enrollment invitation 208 may be able to determine the source of the enrollment invitation 208 and the optical code 202. For instance, the user 113 may be able to determine that the enrollment invitation 208 is generated at a particular enterprise or organization.

The enrollment invitation 208 may enable the optical code 202 to be displayed on the screen/display 212 associated with the supplementary device 108. For instance, when the user 113 views the enrollment invitation 208, the optical code 202 may be visible on the screen/display 212 or the user 113 may select a link in the enrollment invitation 208 which opens a window in which the optical code 202 is displayed.

When the optical code 202 is visible on the screen/display 212, the user 113 may operate an optical scanner or camera on the mobile device 106 to scan the optical code 202. Scanning the optical code 202 may execute the optical code 202 such that information embedded in the optical code 202 is activated. Execution of the optical code 202 by the mobile device 106 may connect the mobile device 106 to the computer interface of the third-party server 104.

A connection performed responsive to the scan of the optical code 202 enables or causes an enrollment page of the enrollment application to be displayed on the first mobile device 106. The connection or a type of a connection between the mobile device 106 and the computer interface may be based on a state of the mobile device 106 and/or one or more applications or programs loaded or running on the first mobile device 106. In some embodiments, the connection of the mobile device 106 with the computer interface may be based on an operating system on the mobile device 106 and/or whether an enrollment application is loaded on the first mobile device 106. For instance, the connection may include an instruction or operation to launch of an app clip associated with the enrollment application. The app clip may direct a user to or display an enrollment page. Launch of the app clip may be responsive to a first operating system being loaded on the first mobile device 106. Some examples of the first operating system may include APPLE® iOS version 11+, ANDROID 10, or another operating system implemented on the first mobile device 106.

Additionally, in this example, the information embedded in the optical code 202 may be configured to launch the enrollment application on which the enrollment page is displayed. The enrollment application may be launched responsive to a second operating system and the enrollment application being loaded on the first mobile device 106. The second operating system may include APPLE® iOS version 10 or earlier. Additionally, in this example, the information embedded in the optical code 202 may be configured to launch of an application distribution platform at the computer interface on which the enrollment application is available. Launch of the application distribution platform may be responsive to the second operating system being loaded on the mobile device 106 and the enrollment application not being loaded on the first mobile device 106. For instance, in response to the mobile device 106 having APPLE® iOS 10 or earlier and not having the enrollment application loaded, the scan of the optical code 202 may connect the mobile device 106 to the APPLE® APPSTORE. In particular, the mobile device 106 may be directed to the enrollment application available on the APPLE® APPSTORE, which may enable the user 113 to download the enrollment application.

In addition to the connection between the mobile device 106 and the computer interface, a scan of the optical code 202 may activate communication of one or more enrollment details. The enrollment details include characteristics related to the first group 112 or the mobile device 106 that are submitted to enroll the first mobile device 106. Some examples of the characteristics might include a group name, a group identifier, CSA information, a server or core identifier, user identifiers, other relevant information, or combinations thereof.

In some embodiments, in addition to the enrollment details, the user 113 may submit or enter some identification input. For instance, the enrollment page may request or provide a field for entry of the identification input of the user 113. Some examples of the identification input may include a name, a username, an email address, a password, another substantially unique information attributed to the user 113, or combinations thereof.

Additionally, in some embodiments, the enrollment application or the enrollment page may be configured to only receive identification input of the user 113. In these and other embodiments, execution of the optical code 202 connects the mobile device 106 to the computer interface. An enrollment page is then displayed on the mobile device 106. The user 113 enters the identification input into the enrollment page. Following entry of the identification input, the enrollment application automatically communicates the enrollment details (e.g., via execution of the optical code 202) along with the entered identification input. The communication of the enrollment details and the identification input may be used to enroll the first mobile device 106.

In some embodiments, the optical code 202 and/or the enrollment application may be configured to interface with a local agent at the first mobile device 106. The local agent may be configured to exist on the mobile device 106 to support ongoing management of the mobile device 106. The local agent may interface with local applications at the mobile device 106 and report to the management module 230 of the management device 102.

In some embodiments, the mobile device 106 may communicate a read signal 210 to the enrollment module 116. The read signal 210 may indicate a status of an enrollment process such as the first enrollment process 200. For instance, the read signal 210 may indicate that the enrollment details are successfully received at the first mobile device 106, that the identification input is entered or rejected, the optical code 202 has been scanned by the mobile device 106, another factor indicative of the status of the first enrollment process 200, or combinations thereof.

Based on the communication of the enrollment details, the identification input, or the read signal 210 the enrollment module 116 may enroll the first mobile device 106. For instance, the mobile device 106 may be enrolled in a managed network such as the managed network 110 of FIG. 1 or another MDM system.

The enrollment of the mobile device 106 may include enabling a set of functions relative to the mobile device 106 in the MDM system. For instance, following enrollment of the first mobile device 106, management signals 262 (in FIG. 2, MGMT signals 262) may be communicated between the management module 230 and the first mobile device 106. The management signals 262 may be based on the policy 204 and the set of functions that correspond to the policy 204. For instance, the management signals 262 may include monitor signals indicating a state or process performed at the first mobile device 106, a command signal that changes a state or a process or state of the first mobile device 106, other management signals, or combinations thereof.

In some embodiments, following enrollment of the first mobile device 106, the enrollment application may be removed from the first mobile device 106. Removal of the enrollment application may reduce the computing resources dedicated to the enrollment application.

In the embodiment of FIG. 2, the mobile device 106 of the first group 112 is enrolled. The first enrollment process 200 may be extended to more than one mobile devices and more than one group. For instance, although not depicted in FIG. 2, a second group selection may be received at the management device 102. The second group selection may designate two or more additional mobile devices as members of a second group. The enrollment module 116 may assign a second policy to the second group. The second policy may include a second set of functions implemented at the two or more additional mobile devices upon enrollment of the two or more additional mobile devices in the MDM system. The set of functions applied to the mobile device 106 may include at least one function that is not included in the second set of functions.

The enrollment module 116 may generate a second optical code. The second optical code may be based on the second policy and the second group among other factors. The second optical code may be communicated to additional supplementary devices associated with the two or more additional mobile devices. The two or more additional mobile devices may be enrolled by scanning the second optical code and optionally entry of identification input.

Figure 3:
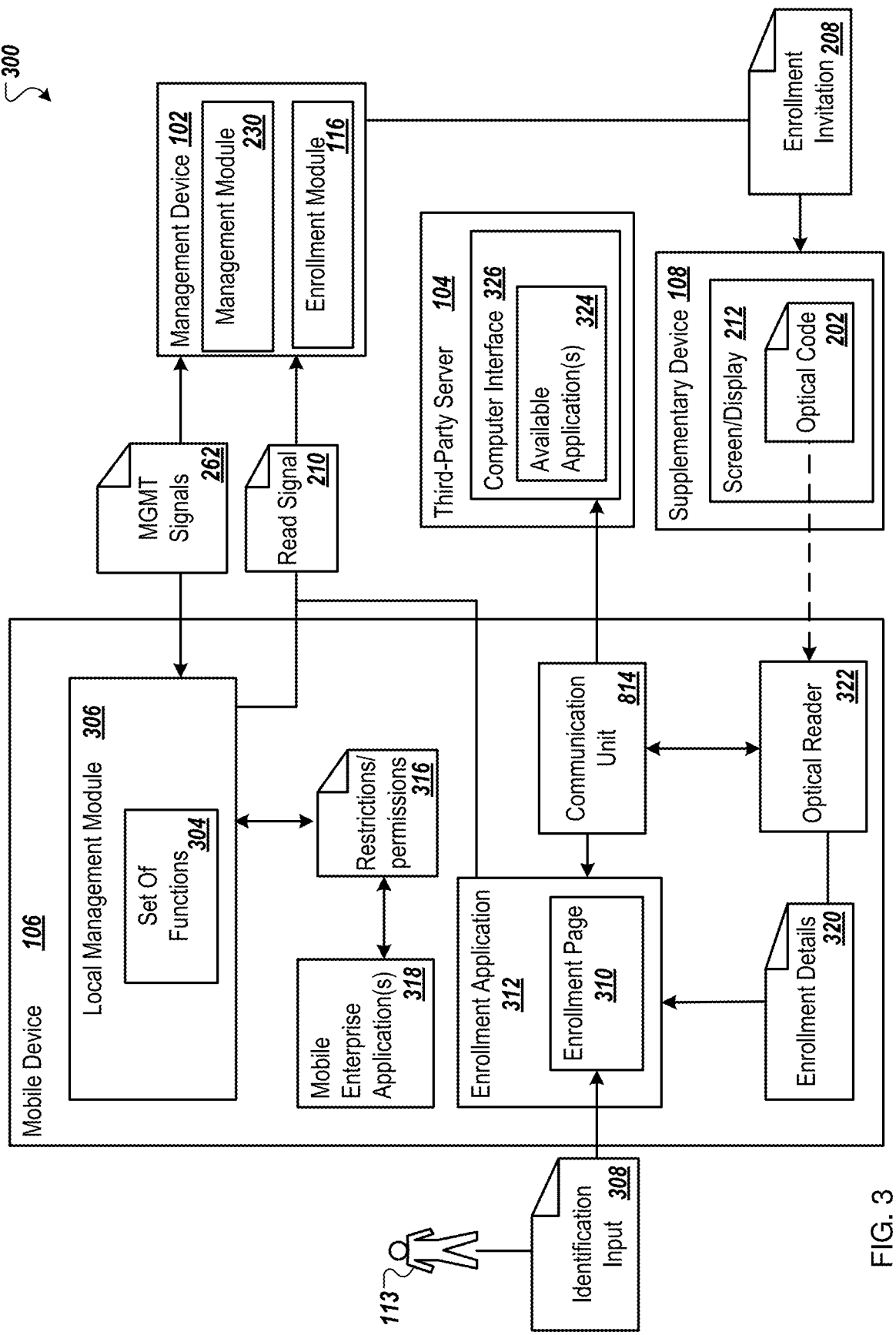
FIG. 3 depicts a block diagram of a second enrollment process that may be implemented in the operating environment of FIG. 1.

FIG. 3 depicts a second example enrollment process 300 (second enrollment process 300) that may be implemented in the operating environment 100 of FIG. 1 or another suitable environment. The second enrollment process 300 is related to the first enrollment process 200 of FIG. 2. For instance, the second enrollment process 300 includes some components (e.g., the first mobile device 106, the supplementary device 108, the management device 102, the third-party server 104, and the user 113) described with reference to FIGS. 1 and 2. The second enrollment process 300 includes several steps and operations that are described in the first enrollment process 200 of FIG. 2. The network 120 of FIG. 1 is omitted from FIG. 3. However, it may be understood with the benefit of the present disclosure information and data may be communicated in the enrollment process via the network 120 of FIG. 1 or another suitable communication network.

The second enrollment process 300 may be implemented at least partially at the mobile device 106 that includes the local management module 306 introduced with reference to FIG. 1 and an optical reader 322. The optical reader 322 may be integral to the mobile device 106 or may be interfaced with the first mobile device 106. Some examples of the optical reader 322 is a mobile device camera or a barcode scanning device.

The second enrollment process 300 may begin with scanning the optical code 202 using the optical reader 322. The optical code 202 may be as described with reference to FIG. 2. For example, as described elsewhere in the present disclosure, the mobile device 106 and one or more other mobile devices may be designated as members of a group based on group selection input (e.g., the group selection input 201 of FIG. 2) received at the management device 102. A policy (e.g., the policy 204 of FIG. 2) may be assigned to the group, which define the set of functions to be implemented by the members of the group upon enrollment in a managed network. The optical code 202 may be generated by the enrollment module 116 based on the policy and the group of the first mobile device 106. The optical code 202 may include enrollment details 320 and may have encoded therein instructions to connect to a computer interface 326 of the third-party server 104. The optical code 202 may be included in the enrollment invitation 208, which may be communicated by the enrollment module 116 of the management device 102 to the supplementary device 108. The optical code 202 may be displayed on the screen/display 212 of the supplementary device 108. The mobile device 106 may scan the optical code 202 when the optical code is displayed on the supplementary device 108.

Furthermore, as described elsewhere in the present disclosure, one or more aspects of the optical code 202 may be customized. The customized aspects of the optical code 202 may facilitate identification of a source of the optical code 202 without effecting a functional parameter of the optical code 202.

Scanning the optical code 202 locally initiates enrollment of the first mobile device 106. In some embodiments, information embedded in the optical code 202 connects the mobile device 106 to the enrollment application 312. The connection to the computer interface 326 may be responsive to the scanning of the optical code 202. For instance, the optical code 202 may have embedded an instruction that may be performed by a communication unit 814 and/or processor (e.g., 810 of FIG. 8) of the first mobile device 106. The instructions may automatically connect the mobile device 106 to the computer interface 326. The automatic connection between the mobile device 106 and the computer interface 326 may be triggered by the mobile device 106 scanning the optical code 202.

In some embodiments, the computer interface 326 may include a webpage or another computer interface on which the enrollment application 312 is accessible. For instance, the computer interface 326 may include an application distribution platform on which available applications 324 are accessible. The enrollment application 312 may be one of the available applications 324. Thus, the enrollment application 312 is accessible at the computer interface 326.

As described elsewhere in the present disclosure, the connection between the computer interface 326 and the mobile device 106 may be based on an operating system of the mobile device 106 and/or may be based on whether the enrollment application 312 is loaded onto the mobile device 106 (e.g., previously downloaded on the mobile device 106). For instance, a first connection may include launching an app clip associated with the enrollment application 312. The app clip may include an enrollment page 310 or may direct the user 113 to the enrollment page 310. The first connection may occur responsive to the optical code 202 being scanned and a circumstance in which the first operating system (e.g., APPLE® iOS 11+) is loaded on the first mobile device 106. A second connection may include launching or opening the enrollment application 312. As used to describe the enrollment application 312, launching may include opening a mobile application or pulling the enrollment application 312 from a cloud server and opening it. The enrollment application 312 may include the enrollment page 310, which may be displayed after the enrollment application 312 is launched. The second connection may occur responsive the optical code 202 being scanned and a second operating system and the enrollment application 312 being loaded on the first mobile device 106. A third connection may include launching the application distribution platform on the first mobile device 106. The enrollment application 312 may be available for download on the launched application distribution platform. The third connection may occur responsive to the optical code 202 being scanned, the second operating system being loaded on the first mobile device 106, and the enrollment application 312 not being loaded on the first mobile device 106.

The enrollment application 312 includes the enrollment page 310. The enrollment page 310 or some portion thereof is displayed to the user 113. The enrollment page 310 may be displayed on a screen or display associated with or integrated into the first mobile device 106. In some embodiments, contents of the enrollment page 310 may be limited according to a security feature setting. The security feature setting may affect or control disclosure of a characteristic on the enrollment page 310. The security feature may be assigned to the group. The characteristic assigned to the group may include, for example, a group name, CSA information, core information, server information, other enrollment information associated with the group, or combinations thereof.

The enrollment page 310 is configured to receive data and information related to enrollment. In some embodiments, the enrollment application 312 or the enrollment page 310 may be configured to only receive identification input 308. The identification input 308 may be combined with the enrollment details 320 embedded in the optical code 202 to enroll the mobile device 106 into the MDM system.

In the second enrollment process 300, identification input 308 may be entered or submitted into the enrollment page 310. For instance, the user 113 may enter the identification input to the enrollment page 310. Alternatively, in some embodiments the enrollment application 312 may receive a face scan of the user 113, may pull from an authenticator application, or otherwise obtain the identification input 308. The identification input 308 may include information used to verify an identity of the user 113 such as a user identifier and a password.

In the second enrollment process 300, data and information may include automatically transferred to the enrollment application 312. The data and information may include the enrollment details 320 and/or the identification input 308. The automatic transfer may occur reduce an amount of information entered by the user 113. For instance, the user 113 may not have to enter the enrollment details 320, which may reduce the likelihood that the user 113 erroneously enters the enrollment details 320. In some embodiments, transfer of the data and information (e.g., the enrollment details 320 and the identification input 308) may be in response to receipt of the identification input 308. Additionally or alternatively, the transfer of the data and information may be responsive to selection of a submit icon on the enrollment page 310.

The read signal 210 may be communicated from the mobile device 106 to the management device 102. The read signal 210 may be generated by the local management module 306 or the enrollment application 312. As described with reference to FIG. 3, the read signal 210 may indicate a status of an enrollment process. For instance, the read signal 210 may indicate the status of the second enrollment process 300 such as that the optical code 202 has been scanned or the identification input 308 (e.g., a user identifier and a password) is entered at the first mobile device 106.

Enrollment of the mobile device 106 may be based on the transfer of the enrollment details, the identification input 308, the read signal 210 or some combination thereof. The enrollment of the mobile device 106 may include a set of functions 304 being enabled at the mobile device 106 consistent with the policy assigned to the group. In particular, following enrollment, the management signals 262 may be communicated between the local management module 306 and the management module 230. The management signals 262 may be used to locally implement the set of functions 304. The set of functions 304 may include one or more functions related to data, software, user access, or another parameter of a management system or a mobile device. For instance, enablement of the set of functions 304 may include communication of a restriction or a permission 316 (in FIG. 3 "restrictions/permissions 316") to mobile enterprise applications 318 on the first mobile device 106. The restriction or permission 316 may modify or determine the mobile enterprise applications 318 to conform to the policy. The restriction or permission 316 may include a use restriction related to a particular software such as the mobile enterprise applications 318, an access restriction related to data, a privilege relative to a particular software such as the mobile enterprise applications 318, or some combination thereof.

In some embodiments, the enrollment application 312 may be removed from the mobile device 106 after enrollment. For instance, the enrollment application 312 itself may include an instruction to be removed from the first mobile device 106, the local management module 306 may remove the enrollment application 312, or the management module 230 may communicate a removal signal as one of the management signals 262 to remove the enrollment application 312.

Figure 4A:
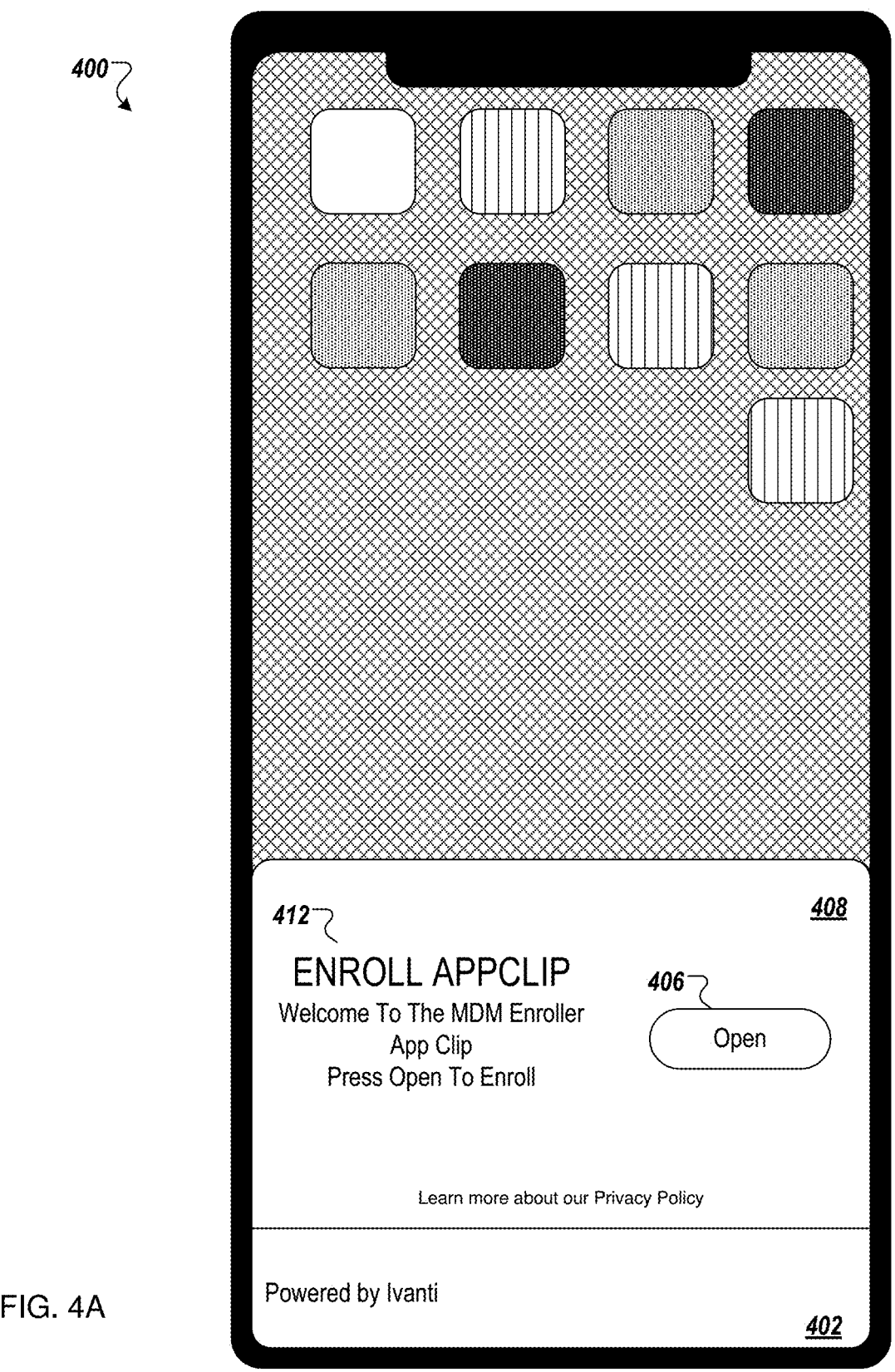
FIG. 4A depicts an example app clip that may be implemented in the enrollment processes of FIGS. 2 and 3.

FIG. 4A is a block diagram of an example mobile device 400 on which an example enrollment app clip 402 is depicted. The enrollment app clip 402 may be implemented in an enrollment process such as the first enrollment process 200 of FIG. 2 or the second enrollment process 300 of FIG. 3. For example, the mobile device 400, which may be substantially similar to and may correspond to the mobile device 106 described elsewhere in the present disclosure. The enrollment app clip 402 may direct the user to the enrollment page 310 described with reference to FIG. 3.

The enrollment app clip 402 may be presented on a portion of a home screen 408 of a display of the mobile device 400. The enrollment app clip 402 may include a customized message 412. For instance, in the depicted embodiment, the customized message 412 is "Welcome To The MDM Enroller App Clip Press Open to Enroll." In other embodiments, the enrollment app clip 402 may include another customized message 412. The customized message 412 may direct the user to select an open button 406.

The enrollment app clip 402 may also include the open button 406. The open button 406 may be selected by a user (e.g., the user 113). Selection of the open button 406 may open the enrollment page 310 on which identification input may be entered. For instance, selection of the open button 406 may result in an enrollment page such as the enrollment page 403 described below is presented to the user. Additionally, selection of the open button 406 may initiate communication of information to an enrollment application and to a management device to enroll the mobile device 400.

In the enrollment app clip 402, the user may not be prompted to provide enrollment details such as CSA information, group information, and the like. Thus, in embodiments in which the enrollment app clip 402 of FIG. 4A are implemented, enrollment of the mobile device 400 may only involve selection of the open button 406 followed by entry of the identification input and selection of an enroll button (described below).

In other embodiments, below the customized message 412, the enrollment app clip 402 may include identification fields configured to receive identification information such as an email or domain or a password. The email or domain and the password are examples of identification input described elsewhere in the present disclosure. Additionally or alternatively, a first portion of the identification input may be received by the app clip 402 and a second portion by an enrollment page. In some embodiments, the app clip 402 may include an enroll button instead of or in addition to an open button. In these embodiments, another suitable mechanism may be implemented to initiate communication of information to an enrollment application and the management device.

Figure 4B:
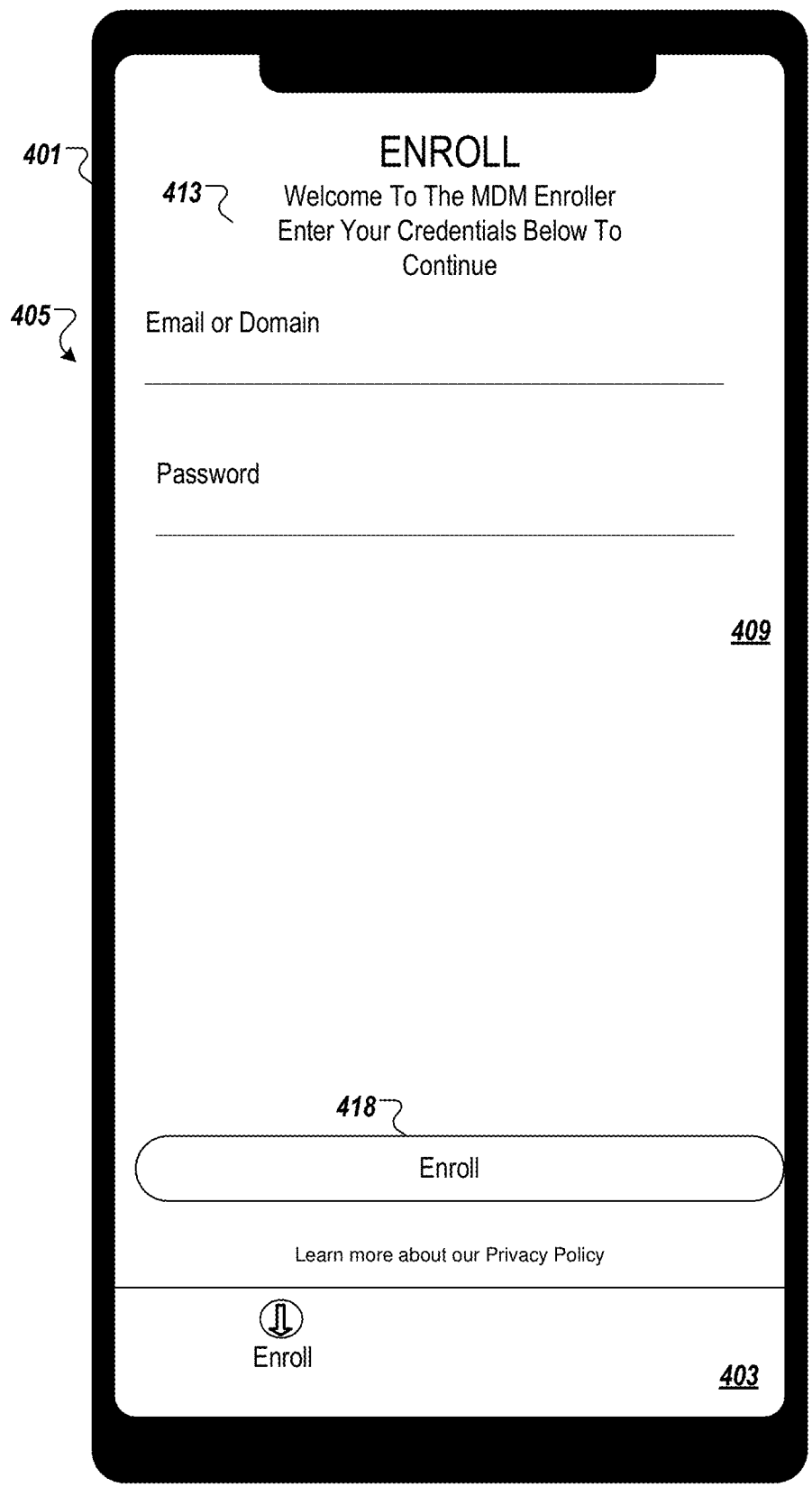
FIG. 4B depicts an example enrollment page that may be implemented in the enrollment processes of FIGS. 2 and 3.

FIG. 4B is another block diagram of a second mobile device 401 on which an example enrollment page 403 is depicted. The enrollment page 403 may be implemented in an enrollment process such as the first enrollment process 200 of FIG. 2 or the second enrollment process 300 of FIG. 3. The enrollment page 403 may be an example of the enrollment page 310 described with reference to FIG. 3. Additionally, the enrollment page 403 may represent an enrollment page that is displayed to a user following selection of the open button 406 described with reference to FIG. 4A. The second mobile device 401 may be substantially similar to the mobile device 106 described elsewhere in the present disclosure.

The enrollment page 403 may be presented on substantially all of a home screen 409 of a display of the second mobile device 401. The enrollment page 403 may include a customized message 413. For instance, in the depicted embodiment, the customized message 413 is "Welcome To The MDM Enroller Enter Your Credentials Below To Continue." In other embodiments, the enrollment page 403 may include another customized message 413.

Below the customized message 413, the enrollment page 403 includes identification fields 405. In the depicted embodiment, the identification fields 405 include a first field in which an email or domain may be entered and a second field in which a password may be entered. The email or domain and the password are examples of identification input described elsewhere in the present disclosure.

The enrollment page 403 may also include an enroll button 418. The enroll button 418 may be selected by a user (e.g., the user 113) after the identification input is entered into the enrollment page 403. The enroll button 418 may initiate communication of information (e.g., the identification input and enrollment details) to an enrollment application and to a management device to enroll the mobile device 401. In some embodiments, the enroll button 418 may be omitted. In these embodiments, another mechanism may be implemented to initiate communication of information to an enrollment application and the management device.

In the enrollment page 403, the user may not be prompted to provide enrollment details such as CSA information, group information, and the like. Thus, in embodiments in which the enrollment page 403 of FIG. 4B are implemented, enrollment of the mobile device 401 may only involve entry of the identification input and selection of the enroll button 418.

With combined reference to FIGS. 4A and 4B, either the enrollment page 403 or the enrollment app clip 402 may be presented on a mobile device (401 or 402) based on a scan of the same optical code. For instance, whether the enrollment page 403 or the enrollment app clip 402 is launched is based on a state of the mobile device such as an operating system and or whether an enrollment application is loaded to the mobile device.

Figure 5:
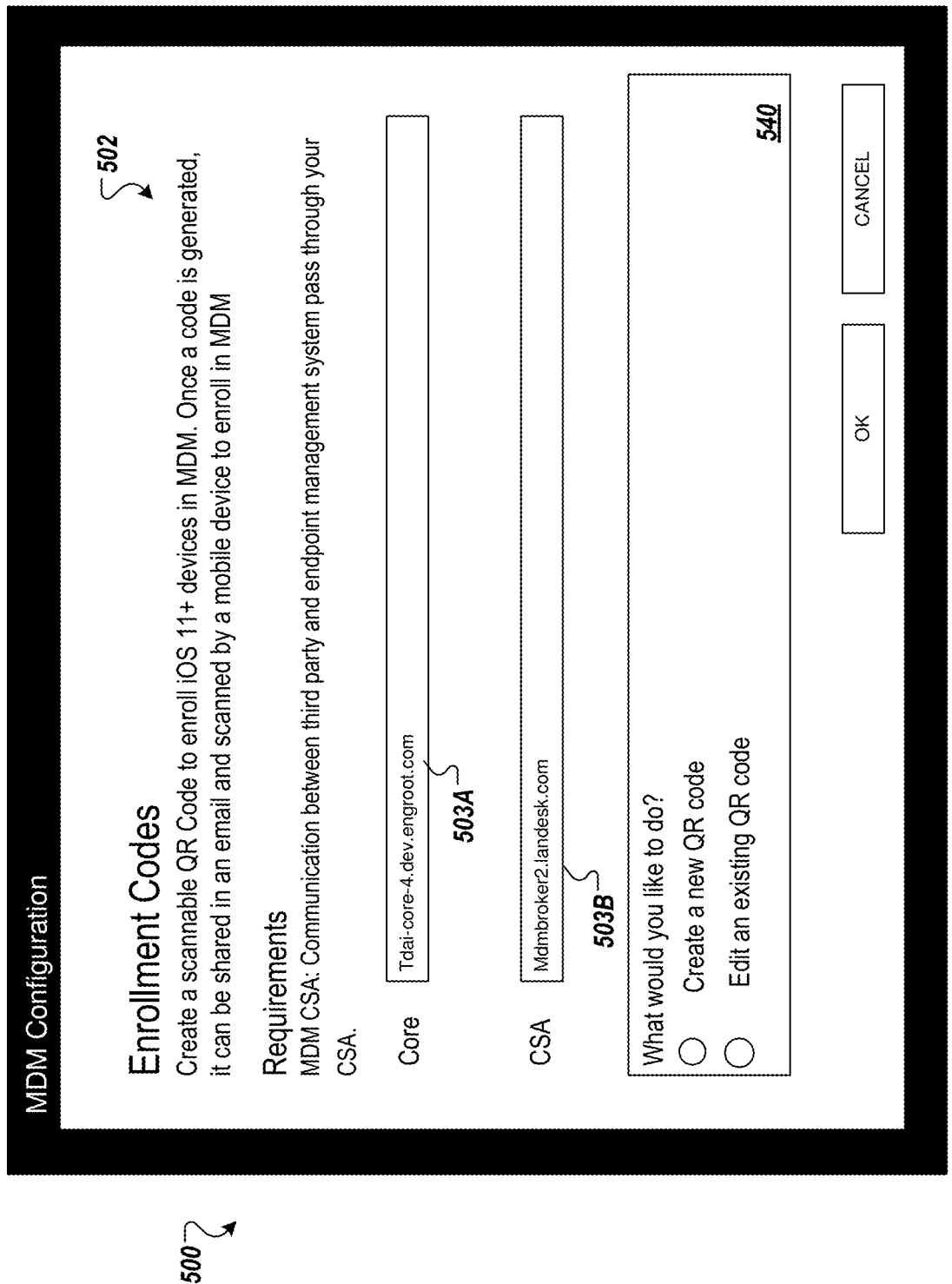
FIG. 5 is a screenshot of an example enrollment link interface that may be implemented in enrollment processes of FIGS. 2 and 3.

FIG. 5 is a screenshot of an example enrollment link interface 500 that may be implemented in an enrollment process such as the first enrollment process 200 of FIG. 2 or the second enrollment process 300 of FIG. 3. For example, the enrollment link interface 500 may be implemented by the management module 230 described elsewhere in the present disclosure.

The enrollment link interface 500 provides one or more messages 502 and one or more fields 503A-503B (collectively, fields 503). The messages 502 may include instructions and requirements regarding use of a QR code. For instance, the messages 502 in the depicted embodiment include "Create a scannable QR code to enroll iOS 11+devices in MDM. Once a code is generated, it can be shared in an email and scanned by a mobile device to enroll in MDM." The messages 502 also include "Requirements MDM CSA: Communication between third party and endpoint management system pass through CSA." Other messages 502 may be included in the enrollment link interface 500.

The fields 503 enable an administrator (e.g., the administrator 115) to enter enrollment details and/or group information. In the depicted embodiment, the fields 503 include a core address field 503A and a CSA information field 503B. The core address field 503A may enable the administrator to identify the core or server address associated with the group. The CSA information field 503B may receive the CSA information related to endpoint communication of the group. The enrollment link interface 500 includes a lower field 540. The lower field 540 enables the administrator to select an option to either create a new QR code or edit an existing QR code.

Figure 6:
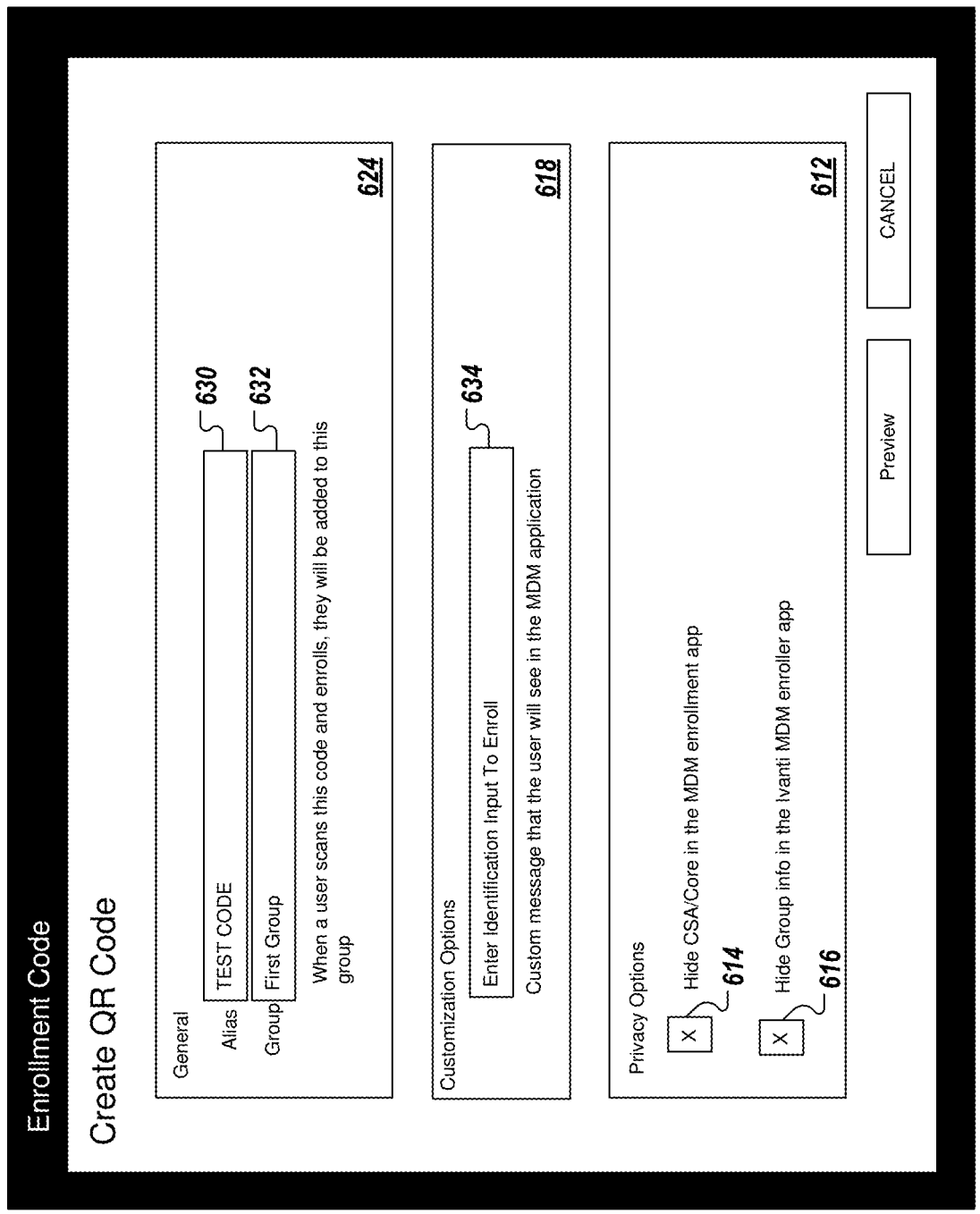
FIG. 6 is a screenshot of an example optical code generation interface that may be implemented in enrollment processes of FIGS. 2 and 3.

FIG. 6 is a screenshot of an example optical code generation interface 600 that may be implemented in an enrollment process such as the first enrollment process 200 of FIG. 2 or the second enrollment process 300 of FIG. 3. For example, the optical code generation interface 600 may be implemented by the management module 230 described elsewhere in the present disclosure. In some embodiments, the optical code generation interface 600 is displayed responsive to selection of the "create a new QR code" in the lower field 540 of the enrollment link interface 500.

The optical code generation interface 600 may include a general portion 624, a customization portion 618, and a privacy portion 612. The general portion 624 includes an alias field 630 and a group field 632. The alias field 630 allows an administrator to provide or enter a name for the optical code. For instance, in the depicted embodiment, an alias may be "TEST CODE." The group field 632 allows the administrator to identify the group into which a mobile device is entered upon enrollment.

The customization portion 618 may enable the administrator to include a customized message on the enrollment page (e.g., 310 of FIG. 3) or an enrollment invitation such as the enrollment invitation 208 of FIGS. 2 and 3. The customization portion 618 includes a message field 634 in which a message may be entered by the administrator. For instance, the message "Enter Identification Input To Enroll" is entered into the message field 634. In other embodiments other messages may be entered into the message field 634 for display on the enrollment page or enrollment invitation.

The privacy portion 612 includes a privacy option selection window. The privacy portion 612 may be configured to receive security selection input such as the security selection input 203 of FIG. 2. The privacy option selection window may enable the administrator to set a security feature related to the enrollment page. For instance, selection of a box 614 may result in the CSA information and the server core information being hidden from the enrollment page. Similarly, selection of a box 616 may result in group information being hidden from the enrollment page.

Figure 7:
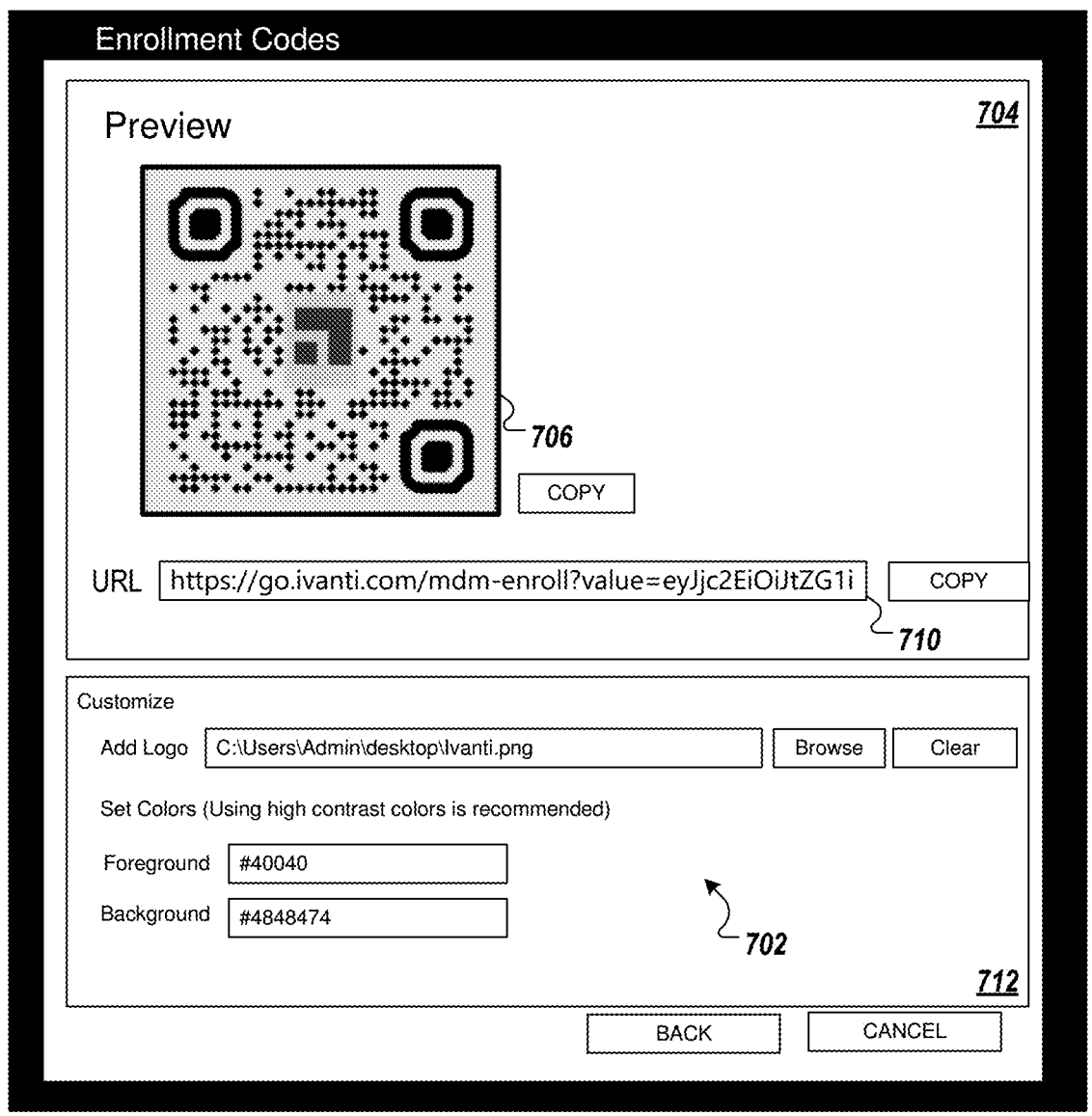
FIG. 7 is a screenshot of an example customization user interface that may be implemented in enrollment processes of FIGS. 2 and 3.

FIG. 7 is a screenshot of an example customization user interface 700 that may be implemented in an enrollment process such as the first enrollment process 200 of FIG. 2 or the second enrollment process 300 of FIG. 3. For example, the customization user interface 700 may be implemented by the management module 230 described elsewhere in the present disclosure.

The customization user interface 700 includes an upper portion 704 and a lower portion 712. The upper portion 704 is configured to preview an optical code 706 as one or more aspects of the optical code 706 are customized. The optical code 706 may be substantially similar to and may correspond to the optical code 202 described elsewhere in the present disclosure. In addition, the upper portion 704 shows the URL that is embedded in the optical code 706. In addition, the upper portion 704 includes a URL field 710. The URL field 710 enables an administrator to view a URL embedded in the optical code 706. Although only a portion of the URL in the URL field 710 is visible, the URL is:
    https://go.ivanti.com/mdm-enroll?value=
        eyJjc2EiOiJtZG1icm9rZXIyLmxhbmRlc2suY29tIiwi
        Y29yZSI6InRkY WktY29yZS00LmRldi5lbmdyb
        290LmNvbSIsImdyb3VwIjoiTXkgZGV2aWNlcyIsI
        m1lc3NhZ2UiOiJXZWxjb21lIHRvIFR5bGVyJ3MgT
        URNIiwiaGlkZVNlcnZlciI6dH
        J1ZSwiaGlkZUdyb3VwIjpmYWxzZX0

In this form of the URL, the user information is obfuscated. Accordingly, the administrator generating the URL cannot see user information or group information included in the URL. In other embodiments, the user information may not be obfuscated. In these and other embodiments, the URL may take the form of:
    go.ivanti.com/mdm-
        enroll?group=secretDeviceGroup&hideServer=
        false& . . .

The lower portion 712 may receive code customization input such as the code customization input 205 of FIG. 2. To customize the optical code 706, customization tools 702 may be implemented. The customization tools 702 may enable an administrator (e.g., 115) to change the color, pattern, background, foreground, etc. In addition, the customization tools 702 may enable addition of a logo to the optical code 706. In the depicted optical code 706, a logo of IVANTI® is inserted into a center portion of the optical code 706.

Figure 8:
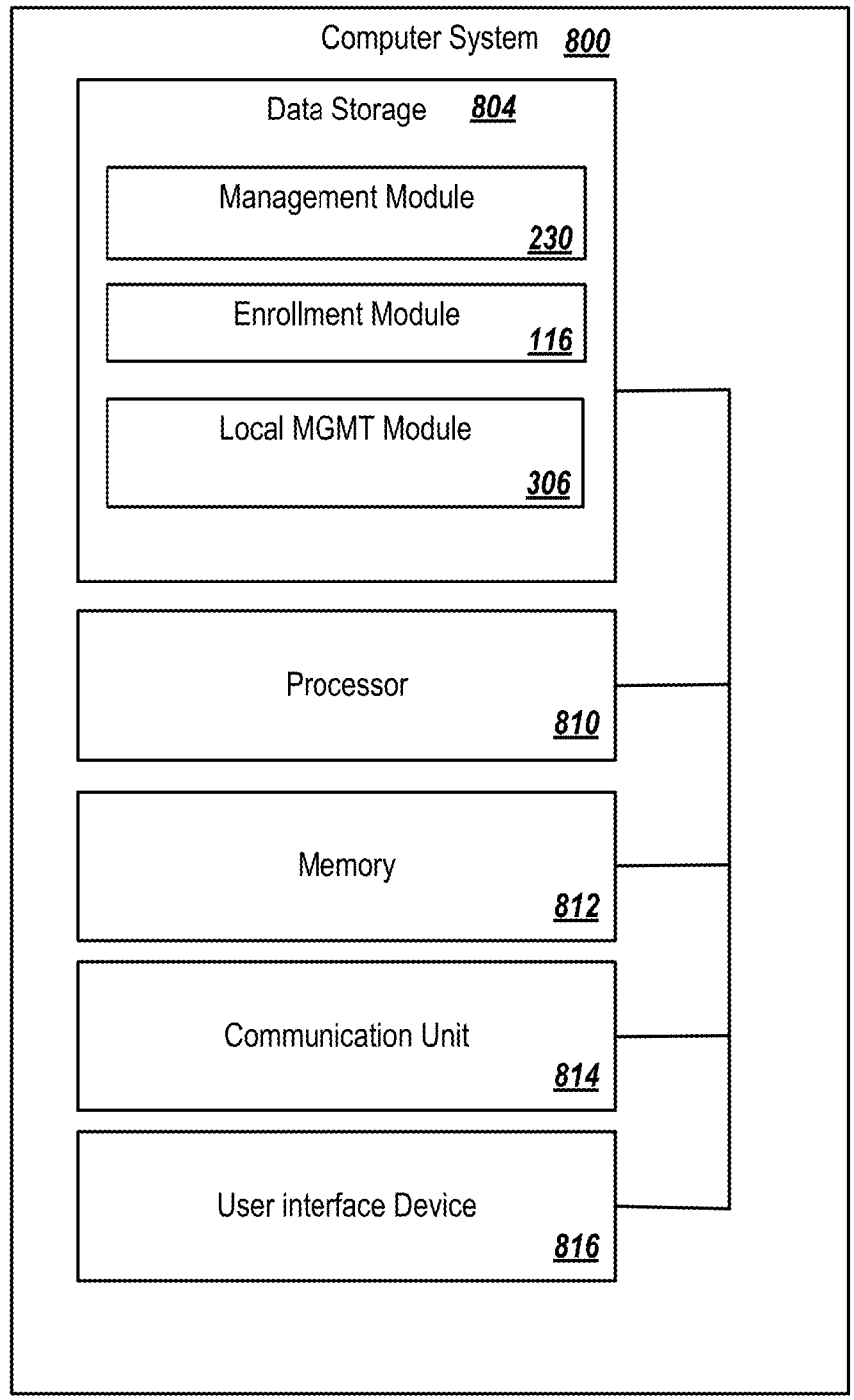
FIG. 8 illustrates an example computer system configured for mobile device management and enrollment.

FIG. 8 illustrates an example computer system 800 configured for mobile device management and enrollment, according to at least one embodiment of the present disclosure. The computer system 800 may be implemented in the operating environment 100 FIG. 1, for instance. Examples of the computer system 800 may include the management device 102, one or more of the mobile devices 106, the supplementary device 108, the third-party server 104, or some combination thereof. The computer system 800 may include one or more processors 810, a memory 812, a communication unit 814, a user interface device 816, and a data storage 804 that includes the management module 230, the enrollment module 116, the local management module 306, (collectively, modules 116/230/306).

The processor 810 may include any suitable special-purpose or general-purpose computer, computing entity, or processing device including various computer hardware or software modules and may be configured to execute instructions stored on any applicable computer-readable storage media. For example, the processor 810 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 8, the processor 810 may more generally include any number of processors configured to perform individually or collectively any number of operations described in the present disclosure. Additionally, one or more of the processors 810 may be present on one or more different electronic devices or computing systems. In some embodiments, the processor 810 may interpret and/or execute program instructions and/or process data stored in the memory 812, the data storage 804, or the memory 812 and the data storage 804. In some embodiments, the processor 810 may fetch program instructions from the data storage 804 and load the program instructions in the memory 812. After the program instructions are loaded into the memory 812, the processor 810 may execute the program instructions.

The memory 812 and the data storage 804 may include computer-readable storage media for carrying or having computer-executable instructions or data structures stored thereon. Such computer-readable storage media may include any available media that may be accessed by a general-purpose or special-purpose computer, such as the processor 810. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 810 to perform a certain operation or group of operations.

The communication unit 814 may include one or more pieces of hardware configured to receive and send communications. In some embodiments, the communication unit 814 may include one or more of an antenna, a wired port, and modulation/demodulation hardware, among other communication hardware devices. In particular, the communication unit 814 may be configured to receive a communication from outside the computer system 800 and to present the communication to the processor 810 or to send a communication from the processor 810 to another device or network (e.g., 108 or 120 of FIG. 1 or FIG. 2).

The user interface device 816 may include one or more pieces of hardware configured to receive input from and/or provide output to a user. In some embodiments, the user interface device 816 may include one or more of a speaker, a microphone, a display, a keyboard, a touch screen, or a holographic projection, among other hardware devices.

The modules 116/230/306 may include program instructions stored in the data storage 804. The processor 810 may be configured to load the modules 116/230/306 into the memory 812 and execute the modules 116/230/306. Alternatively, the processor 810 may execute the modules 116/230/306 line-by-line from the data storage 804 without loading them into the memory 812. When executing the modules 116/230/306, the processor 810 may be configured to perform one or more processes or operations described elsewhere in this disclosure.

Modifications, additions, or omissions may be made to the computer system 800 without departing from the scope of the present disclosure. For example, in some embodiments, the computer system 800 may not include the user interface device 816. In some embodiments, the different components of the computer system 800 may be physically separate and may be communicatively coupled via any suitable mechanism. For example, the data storage 804 may be part of a storage device that is separate from a device, which includes the processor 810, the memory 812, and the communication unit 814, that is communicatively coupled to the storage device. The embodiments described herein may include the use of a special-purpose or general-purpose computer including various computer hardware or software modules, as discussed in greater detail below.

Figure 9:
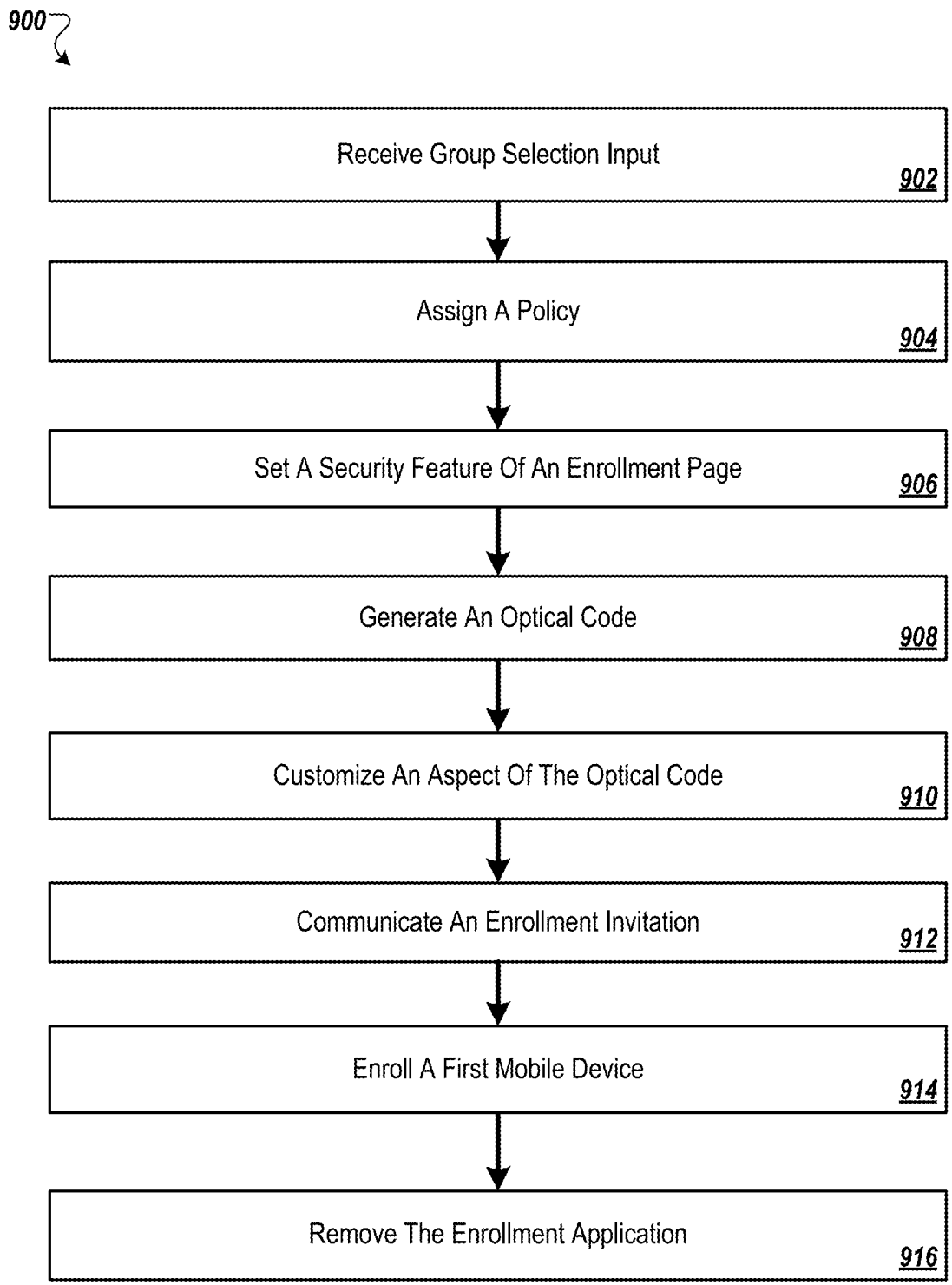
FIG. 9 is a flow chart of an example method of mobile device enrollment and management.

FIG. 9 is a flow chart of an example method 900 of mobile device enrollment and management, according to at least one embodiment described in the present disclosure. As described elsewhere in the present disclosure, the method 900 may involve or may be based on information distributed in an endpoint management system using an optical code. The method 900 may be performed in a suitable operating environment such as the operating environment 100 or the managed network 110 of FIG. 1. The method 900 may be performed by one or more of the management device 102 described elsewhere in the present disclosure or by another suitable computing system, such as the computer system 800 of FIG. 8. In some embodiments, the management device 102 or the other computing system may include or may be communicatively coupled to a non-transitory computer-readable medium (e.g., the memory 812 of FIG. 8) having stored thereon programming code or instructions that are executable by one or more processors (such as the processor 810 of FIG. 8) to cause a computing system or the management device 102 to perform or control performance of the method 1000. Additionally or alternatively, the management device 102 may include the processor 810 that is configured to execute computer instructions to cause the management device 102 or another computing systems to perform or control performance of the method 1000. The management device 102 or the computer system 800 implementing the method 900 may be included in a cloud-based managed network, an on-premises system, or another suitable network computing environment.

The method 900 may begin at block 902, in which group selection input may be received. The group selection input may be received at a first device. The first device may be a management device or may be configured to communicate with a management device of a managed network. The group selection input may be configured to designate two or more mobile devices of multiple mobile devices as members of a group. In some embodiments, the members of the group may have a common attribute. The common attribute may be a reason that the members of the group would be managed in a similar fashion. Some examples of the common attribute may include an enterprise role, a security assignment, a privilege to particular information, use of a software application, device access, or some combination thereof.

At block 904, a policy may be assigned. The policy may be assigned to the group or to at least one mobile device. The policy may include a set of functions to be implemented upon enrollment in an MDM system. The policy may dictate the roles, security, data access restrictions, etc. consistent with the common attribute of the group or mobile device. The set of functions include may include, for example, a use restriction related to a particular software, an access restriction related to data, a privilege relative to a particular software, other functions or limitations, or combinations thereof.

At block 906, a security feature of an enrollment page may be set. In some embodiments, the security feature may include a control of disclosure of a characteristic assigned to the group. The characteristic assigned to the group may include a group name, a CSA, a server associated with the group, or combinations thereof. The control of disclosure may include an option to display the characteristic in the enrollment page or to obscure this information in the enrollment page.

At block 908, an optical code may be generated. The optical code may be generated based on the policy, the group, or other relevant information such as the enrollment URL, a CSA, etc. The optical code may have encoded therein information. Upon execution of the optical code (e.g., scanning by an optical scanner of a mobile device), the optical code is configured to connect the mobile devices with a computer interface. An enrollment application may be accessible on the computer interface. Additionally, the optical code may include information (e.g., enrollment details) configured to support enrollment of the mobile devices into the MDM system according to the policy assigned to the group.

In some embodiments, the optical code may be configured such that a scan by the optical reader automatically submits one or more enrollment details to the enrollment application. In some embodiments, the optical code may be configured to interface with a local agent at the mobile devices. The local agent may be configured for ongoing local management in a managed network.

In some embodiments, the enrollment application may be configured to limit input required by a user. For instance, in some embodiments the enrollment application may be configured to only receive identification input in addition to the enrollment details of the optical code to enroll the first mobile device into the MDM system. In other embodiments, the enrollment application may take information through a biometric sensor or facial scanning device to at least partially identify the user. Additionally still, the enrollment application may receive or interface with an authentication application to further authenticate the user of the mobile device. In some embodiments, the identification input includes a password and a user identifier such as an email or user ID. In these and other embodiments, the identifier and the password may be manually input into the enrollment page. In other embodiments, the identification input may include be automatically entered through an authentication application, a visual scanner, a biometric sensor, or another suitable system.

At block 910, an aspect of the optical code may be customized. An aspect of the optical code may be customized based on received input. The aspect may be customized to facilitate identification of a source of the optical code without effecting a functional parameter of the optical code. Some aspects might include color, size, a message, a logo, or combinations thereof.

At block 912, an enrollment invitation may be communicated. The enrollment invitation may be communicated to supplementary devices. For instance, if a group includes two or more mobile devices (e.g., five mobile devices), then the enrollment invitation may be communicated to two or more supplementary devices (e.g., five supplementary devices) each of which may be associated with a user of one of the two or more mobile devices. The enrollment invitation may include the optical code. Inclusion of the optical code may enable the optical code to be displayed on a screen associated with the supplementary device.

At block 914, a first mobile device may be enrolled. In some embodiments enrollment of the first mobile device includes enabling the set of functions relative to the first mobile device in the MDM system. For example, the management device and/or a local agent at the first mobile device may enforce the policy following the enrollment.

Generally, the first mobile device may be enrolled following execution of the optical code by the first mobile device. Execution of the optical code may include scanning the optical code. In some embodiments, the optical code may be scanned as the optical code is displayed on the screen of the supplementary device associated with the user of the first mobile device.

As stated above, execution of the optical code may connect the mobile device with a computer interface on which the enrollment application is accessible. A connection and/or a connection type may be based on applications loaded on the mobile device. For example, execution of the optical code may launch of an app clip associated with the enrollment application. The app clip may include an enrollment page, which is displayed when the connection is made or may direct a user to the enrollment page. The app clip may be launched responsive to a first operating system being loaded on the first mobile device. For example, the first operating system may include a particular operating system (e.g., APPLE iOS 11+ or another suitable operating system). Additionally, the execution of the optical code may launch of the enrollment application. The enrollment application may display the enrollment page. The enrollment application may be launched responsive to a second operating system (e.g., APPLE iOS 10 or earlier-released OS) and the enrollment application being loaded on the first mobile device. Additionally still, the execution of the optical code may launch of an application distribution platform. The launch of an application distribution platform may be responsive to the second operating system being loaded on the first mobile device and the enrollment application not being loaded on the first mobile device. The enrollment application may be available on the application distribution platform. A user of the first mobile device may then download the enrollment application from the application distribution platform. The enrollment page may be automatically displayed in the enrollment application.

In some embodiments, after the optical code is executed and one or more enrollment steps are taken at the first mobile device, a read signal may be generated. In these and other embodiments, the first mobile device may be enrolled in the MDM system responsive to receipt of a read signal. The read signal may indicate that the optical code has been scanned by an optical reader of the first mobile device. Additionally or alternatively, the read signal may be generated responsive to the one or more enrollment steps such as entry of the identification input (the user identifier and the password) is received at the first mobile device. At block 916, the enrollment application may be removed. The enrollment application may be removed from the first mobile device following enrollment of the first mobile device in the MDM system.

Further, modifications, additions, or omissions may be made to the methods without departing from the scope of the present disclosure. For example, the operations of methods may be implemented in differing order. Furthermore, the outlined operations and actions are only provided as examples, and some of the operations and actions may be optional, combined into fewer operations and actions, or expanded into additional operations and actions without detracting from the disclosed embodiments.

For example, in some embodiments, the method 900 may be implemented in operating environments and/or managed networks in which there are two or more groups of mobile devices and two or more policies. For example, the first and the second mobile devices may be designated as members of a first group and a third and a fourth mobiles may be designated as members of a second group. One of the policies may be assigned to each of the groups. For instance, a first policy may be assigned to the first group and a second policy may be assigned to the second group. Each of the policies may be associated with a set of functions, which dictate how the endpoints (e.g., the mobile devices and potentially other computer devices) in the group is managed in the managed network.

In these and other embodiments, the method 900 may include additional steps for enrollment of the mobile devices in each of the two or more groups. For instance, the method 900 may include receiving, at the first device, a second group selection that designates two or more additional mobile devices (e.g., the third and fourth mobile devices) of the multiple mobile devices as members of a second group. The method 900 may include assigning the second policy to the second group. The second policy may include a second set of functions implemented at the additional mobile devices upon enrollment in the MDM system. In some embodiments, the sets of functions of each policy may be different. For instance, the first policy of the first group, which may include the first mobile device, may include at least one function that is not included in the second set of functions of the second policy.

Two or more optical codes may be generated. A first optical code may be generated for the first group (as described above) and a second optical code may be generated for the second group. Each of the optical codes may have encoded therein information used to connect the members of the groups to the enrollment application. Additionally, the optical codes may support enrollment of the members of the group in the MDM system such that the members of the group are managed according to the assigned policy following enrollment. As described above, the optical codes may be customized, and security features may be set for each of the groups.

In some embodiments, two or more additional enrollment invitations may be communicated to sets of supplementary devices. The enrollment invitations may include corresponding optical codes, which are displayable on a screen associated with the supplementary devices. The mobile devices in each group may be enrolled in the MDM system through scanning the respective optical code and/or taking one or more enrollment steps.

Figure 10:
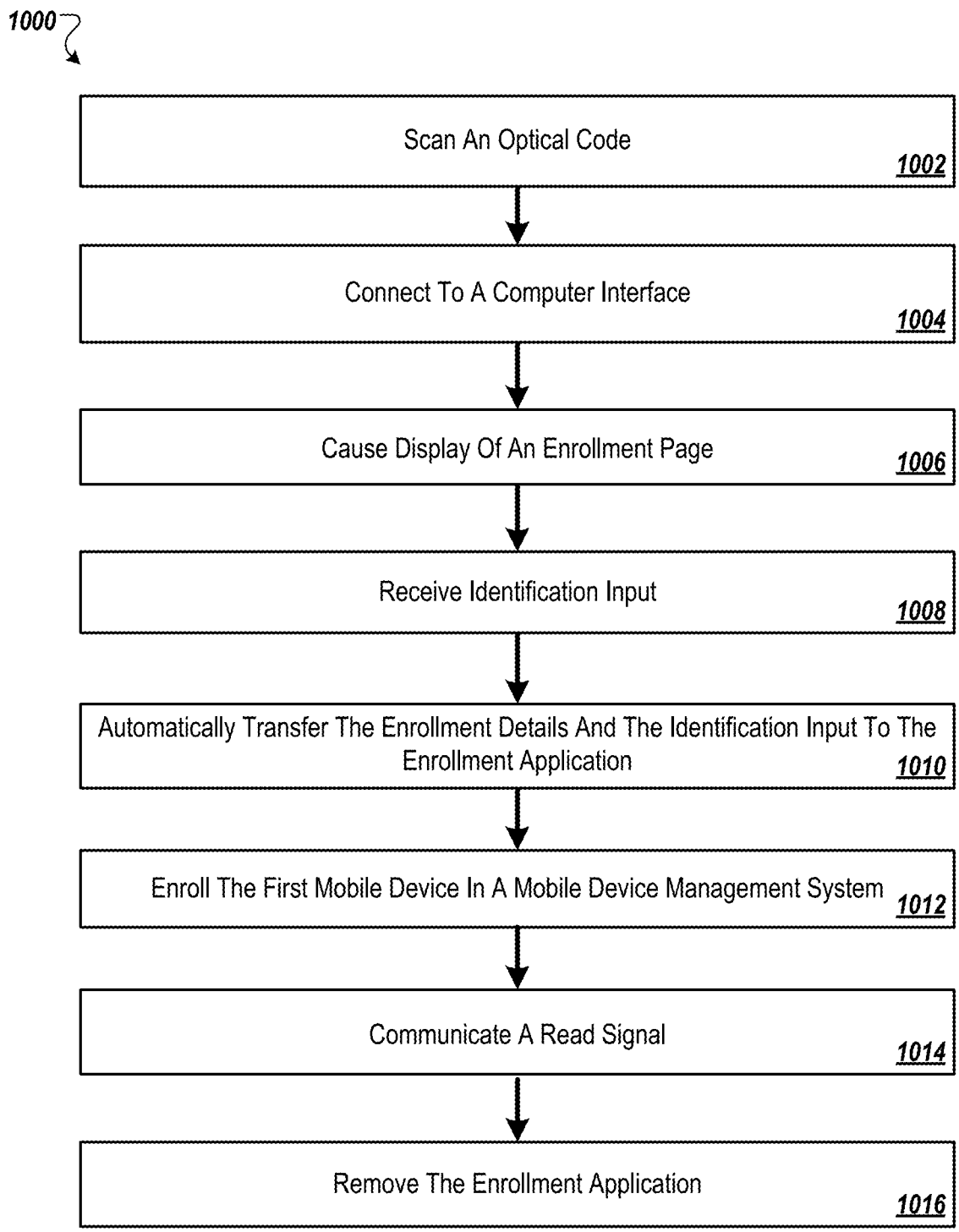
FIG. 10 is a flow chart of an example method of mobile device enrollment and management, all according to at least one embodiment described in the present disclosure.

FIG. 10 is a flow chart of an example method 1000 of mobile device enrollment and management, according to at least one embodiment described in the present disclosure. As described elsewhere in the present disclosure, the method 1000 may involve or may be based on information distributed in an endpoint management system using an optical code. The method 1000 may be performed in a suitable operating environment such as the operating environment 100 or the managed network 110 of FIG. 1. The method 1000 may be performed by one or more of the mobile devices 106 described elsewhere in the present disclosure or by another suitable computing system, such as the computer system 800 of FIG. 8. In some embodiments, the mobile devices 106 or the other computing system may include or may be communicatively coupled to a non-transitory computer-readable medium (e.g., the memory 812 of FIG. 8) having stored thereon programming code or instructions that are executable by one or more processors (such as the processor 810 of FIG. 8) to cause a computing system or the mobile devices 106 to perform or control performance of the method 1000. Additionally or alternatively, the mobile devices 106 may include the processor 810 that is configured to execute computer instructions to cause the mobile devices 106 or another computing systems to perform or control performance of the method 1000. The mobile device or computer system 800 implementing the method 1000 may be included in a cloud-based managed network, an on-premises system, or another suitable network computing environment.

The method 1000 may begin at block 1002, in which an optical code may be scanned. The optical code may be scanned by an optical reader of a first mobile device. The optical code may be generated based on a policy and/or a group in which the first mobile device is included. The optical code may have encoded therein enrollment details that are associated with the policy. The policy may define a set of functions to be implemented by the first mobile device and other the members of the group upon enrollment in the MDM system.

For example, the first mobile device and a second mobile device may be designated as members of the group based on selection input received at a server device. In some embodiments, the first mobile device and the second mobile device are included in multiple mobile devices that are associated with an entity such as an enterprise or an organization. The first mobile device and the second mobile device may be designated as members of the group because they have a common attribute. For instance, the common attribute may include an enterprise role, a security assignment, a privilege to particular information, use of a software application, device access, or some combination thereof. Accordingly, the first mobile device and the second mobile device should be managed in a similar fashion.

In some embodiments, the optical code may be displayed on a screen of a supplementary device, which is associated with a user of the first mobile device. The optical code may be displayed on the screen when the optical code is scanned by the first mobile device. In some embodiments, one or more aspects of the optical code may be customized to facilitate identification of a source of the optical code without effecting a functional parameter of the optical code. The optical code may be included in an enrollment invitation that is communicated by the server device to the supplementary device. Additionally, in some embodiments, the optical code may be configured to interface with a local agent at the first mobile device.

At block 1004, the mobile device may connect to a computer interface. The mobile device may connect to a computer interface responsive to the scanning of the optical code. The enrollment application may be accessible (e.g., via a communication network) on the computer interface. The computer interface may be a mobile application distribution platform such as the Apple® Appstore, Google Play®, Huawei® App Store, Amazon® Appstore, or another suitable computer interface. In some embodiments, the optical code and the enrollment application may be configured to operate with a computer interface associated with a particular third party. Additionally or alternatively, the first mobile device and/or the operating system of the first mobile device may also be associated with the third party. For example, the first mobile device may include an Apple® hardware product (e.g., an Apple® iPhone®). The first mobile device may be implementing an operating system associated with Apple® (e.g., Apple® iOS). Accordingly, the optical code may be configured to access the enrollment application on the Apple® Appstore.

A connection of the first mobile device with the computer interface on which the enrollment application is accessible may differ based on applications running or loaded to the first mobile device. For instance, responsive to a first operating system (e.g., iOS version 11+) being loaded on the first mobile device, the connection to the computer interface may include launching an app clip associated with the enrollment application on which an enrollment page is displayed or direct the user to the enrollment page. Alternatively, responsive to a second operating system (e.g., an earlier version of iOS) and the enrollment application being loaded on the first mobile device, the connection to the computer interface may include launching an enrollment application on which the enrollment page is displayed. Alternatively still, responsive to the second operating system (e.g., an earlier version of iOS) being loaded on the first mobile device and the enrollment application not being loaded on the first mobile device, the connection to the computer interface may include launching an application distribution platform on which the enrollment application is available.

The enrollment page of the enrollment application may be configured to interface with a use to complete enrollment. In some embodiments, the enrollment page may be configured to only receive identification input in addition to the enrollment details to enroll the first mobile device into the MDM system. Additionally or alternatively, the enrollment page may include characteristics of the group based on a security setting.

At block 1006, display of the enrollment page may be caused. Display of the enrollment page may be caused on a screen of the first mobile device. The enrollment page may include one or more icons and/or messages used for enrollment of the first mobile device. In some circumstances, a portion of the icons or messages may be set by a security feature. For instance, disclosure of a characteristic assigned to the group may be controlled by a security feature setting applied to the enrollment page. The control of disclosure of the characteristic may include an option to display the characteristic in the enrollment page. The characteristic assigned to the group may include for example, a group name or a server, a CSA, associated with the group.

At block 1008, the identification input may be received. In some embodiments, the identification input may be entered into the enrollment page. For instance, a user may enter the identification input through implementation of a user interface device (e.g., 816 of FIG. 8) such as electronic keyboard of the first mobile device. In some embodiments, the identification input may include a user identifier and a password. The user identifier may be an email address, another network address of the user, a username, a number assigned to the user, or some combinations or derivations thereof.

At block 1010, enrollment details and the identification input may be automatically transferred. The enrollment details and the identification input may be automatically transferred responsive to receipt of the identification input. For instance, a user may enter the identification input into an enrollment page, which may cause transfer of the enrollment details and/or the identification input. In some embodiments, a user may also select an enrollment icon or otherwise initiate the automatic transfer of the enrollment details and/or the identification input. The enrollment details and the identification input may be automatically transferred to the enrollment application, the service device, some other computing program or device, or some combination thereof.

At block 1012, the first mobile device may be enrolled in an MDM system. In some embodiments, the first mobile device may be enrolled based, at least partially, on the transfer of and/or entry of the enrollment details and the identification input. In some embodiments, enrollment of the first mobile device may include enabling a set of functions of the first mobile device in the MDM system consistent with the policy assigned to the group. The set of functions may include restrictions and limitations regarding data and information available to the first mobile device. In some embodiments, the set of functions may include a use restriction related to a particular software, an access restriction related to data, and a privilege relative to a particular software.

At block 1014, a read signal may be communicated. The read signal may be communicated to the server device. The read signal may indicate that the optical code has been scanned. Additionally or alternatively, the read signal may indicate that the identifier input is entered at the first mobile device, the enrollment has occurred, the identification input is defective, etc.

At block 1016, the enrollment application may be removed. The enrollment application may be removed from the first mobile device after enrollment of the first mobile device in the endpoint management system. Removal of the enrollment application may free up computer storage space on the first mobile device. Following enrollment, the first mobile device may be included in the management system. For instance, the server device, which is configured as a management device, may monitor the first mobile device after enrollment through ongoing communication and may enable the server device to ensure compliance with the policy.

Although illustrated as discrete blocks, one or more blocks in FIGS. 9 and 10 may be divided into additional blocks, combined into fewer blocks, or eliminated, depending on the desired implementation.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

The various features illustrated in the drawings may not be drawn to scale. The illustrations presented in the present disclosure are not meant to be actual views of any particular apparatus (e.g., device, system, etc.) or method, but are representations employed to describe embodiments of the disclosure. Accordingly, the dimensions of the features may be expanded or reduced for clarity. In addition, some of the drawings may be simplified for clarity. Thus, the drawings may not depict all of the components of a given apparatus (e.g., device) or all operations of a particular method.

Terms used in the present disclosure and the claims (e.g., bodies of the appended claims) are intended as "open" terms (e.g., the term "including" should be interpreted as "including, but not limited to," the term "having" should be interpreted as "having at least," the term "includes" should be interpreted as "includes, but is not limited to," among others). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in instances in which a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Further, any disjunctive word or phrase presenting two or more alternative terms should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

The terms "first," "second," "third," etc., are not necessarily used to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the scope of the invention.

What is claimed is:

1. A method of mobile device management, the method comprising:
receiving, at a first device, group selection input that is configured to designate two or more mobile devices of a plurality of mobile devices as members of a group;

assigning a policy to the group, the policy including a set of functions to be implemented at the two or more mobile devices upon enrollment of the two or more mobile devices in a mobile device management system;

generating an optical code based on the policy and the group, the optical code having encoded therein information that upon execution of the optical code is configured to connect the two or more mobile devices with a computer interface on which an enrollment application is accessible and information configured, upon execution, to support enrollment of the two or more mobile devices into the mobile device management system according to the policy assigned to the group;

setting a security feature of an enrollment page, wherein the security feature includes control of disclosure of a characteristic assigned to the group, wherein the characteristic assigned to the group includes a group name or a server associated with the group, and the control of disclosure includes an option to display the characteristic in the enrollment page;

obscuring user identifier information in a uniform resource locator (URL) address embedded in the optical code;

communicating an enrollment invitation to two or more supplementary devices each associated with a user of one of the two or more mobile devices, wherein the enrollment invitation includes the optical code such that the optical code is displayable on a screen associated with the supplementary devices; and enrolling a first mobile device of the two or more mobile devices in the mobile device management system responsive to receipt of a read signal indicating that the optical code has been scanned by an optical reader of the first mobile device as the optical code is displayed on the screen of the supplementary device associated with the user of the first mobile device, wherein enrollment of the first mobile device includes enabling the set of functions relative to the first mobile device in the mobile device management system.

2. The method of claim 1, wherein:
the optical code is configured such that a scan by the optical reader automatically submits one or more enrollment details into the enrollment application;
the enrollment application is configured to only receive identification input in addition to the enrollment details to enroll the first mobile device into the mobile device management system;
the identification input includes a user identifier and a password; and
the read signal further indicates that the user identifier and the password is entered at the first mobile device.

3. The method of claim 1, wherein:
the group is a first group;
the policy is a first policy;
the set of functions is a first set of functions;
the optical code is a first optical code; and
the enrollment invitation is a first enrollment invitation, the method further comprising:
  receiving, at the first device, a second group selection that designates two or more additional mobile devices of the plurality of mobile devices as members of a second group;
  assigning a second policy to the second group, the second policy including a second set of functions implemented at the two or more additional mobile devices upon enrollment of the two or more additional mobile devices in the mobile device management system; and
  generating a second optical code based on the second policy and the second group, the optical code being configured to connect the two or more additional mobile devices with the computer interface on which the enrollment application is accessible and being configured, upon execution, to support enrollment of the two or more additional mobile devices into the mobile device management system according to the second policy assigned to the second group,
  wherein the first set of functions includes at least one function that is not included in the second set of functions.

4. The method of claim 1, further comprising customizing an aspect of the optical code based on received input, wherein the aspect is configured to facilitate identification of a source of the optical code without effecting a functional parameter of the optical code.

5. The method of claim 1, wherein a connection of the two or more mobile devices with the computer interface on which the enrollment application is accessible includes:
launch of an app clip associated with the enrollment application that directs a user to an enrollment page is displayed responsive to a first operating system being loaded on the first mobile device;
launch of the enrollment application on which the enrollment page is displayed responsive to a second operating system and the enrollment application being loaded on the first mobile device; and
launch of an application distribution platform on which the enrollment application is available responsive to the second operating system being loaded on the first mobile device and the enrollment application not being loaded on the first mobile device.

6. The method of claim 1, further comprising removing the enrollment application from the first device following enrollment of the first device in the mobile device management system.

7. The method of claim 1, wherein the optical code is configured to interface with a local agent at the two or more mobile devices.

8. The method of claim 1, wherein:
the members of the group have a common attribute; and
the common attribute includes an enterprise role, a security assignment, a privilege to particular information, use of a software application, or device access.

9. The method of claim 1, wherein the set of functions include:
a use restriction related to a particular software;
an access restriction related to data; and
a privilege relative to a particular software.

10. A non-transitory computer-readable medium having encoded therein programming code executable by one or more processors to perform or control performance of operations comprising:
receiving, at a first device, group selection input that is configured to designate two or more mobile devices of a plurality of mobile devices as members of a group;
assigning a policy to the group, the policy including a set of functions to be implemented at the two or more mobile devices upon enrollment of the two or more mobile devices in a mobile device management system;
generating an optical code based on the policy and the group, the optical code having encoded therein information that upon execution of the optical code is configured to connect the two or more mobile devices with a computer interface on which an enrollment application is accessible and information configured, upon execution, to support enrollment of the two or more mobile devices into the mobile device management system according to the policy assigned to the group;

setting a security feature of an enrollment page, wherein the security feature includes control of disclosure of a characteristic assigned to the group, wherein the characteristic assigned to the group includes a group name or a server associated with the group, and the control of disclosure includes an option to display the characteristic in the enrollment page;

obscuring user identifier information in a uniform resource locator (URL) address embedded in the optical code;

communicating an enrollment invitation to two or more supplementary devices each associated with a user of one of the two or more mobile devices, wherein the enrollment invitation includes the optical code such that the optical code is displayable on a screen associated with the supplementary devices; and enrolling a first mobile device of the two or more mobile devices in the mobile device management system responsive to receipt of a read signal indicating that the optical code has been scanned by an optical reader of the first mobile device as the optical code is displayed on the screen of the supplementary device associated with the user of the first mobile device, wherein enrollment of the first mobile device includes enabling the set of functions relative to the first mobile device in the mobile device management system.

11. The non-transitory computer-readable medium of claim 10, wherein:
the optical code is configured such that a scan by the optical reader automatically submits one or more enrollment details into the enrollment application;
the enrollment application is configured to only receive identification input in addition to the enrollment details to enroll the first mobile device into the mobile device management system;
the identification input includes a user identifier and a password; and
the read signal further indicates that the user identifier and the password is entered at the first mobile device.

12. The non-transitory computer-readable medium of claim 10, wherein:
the group is a first group;
the policy is a first policy;
the set of functions is a first set of functions;
the optical code is a first optical code;
the enrollment invitation is a first enrollment invitation; and
the operations further comprise:
receiving, at the first device, a second group selection that designates two or more additional mobile devices of the plurality of mobile devices as members of a second group;

assigning a second policy to the second group, the second policy including a second set of functions implemented at the two or more additional mobile devices upon enrollment of the two or more additional mobile devices in the mobile device management system; and generating a second optical code based on the second policy and the second group, the optical code being configured to connect the two or more additional mobile devices with the computer interface on which the enrollment application is accessible and being configured, upon execution, to support enrollment of the two or more additional mobile devices into the mobile device management system according to the second policy assigned to the second group; and the first set of functions includes at least one function that is not included in the second set of functions.

13. The non-transitory computer-readable medium of claim 10, wherein the operations further comprise customizing an aspect of the optical code based on received input, wherein the aspect is configured to facilitate identification of a source of the optical code without effecting a functional parameter of the optical code.

14. The non-transitory computer-readable medium of claim 10, wherein a connection of the two or more mobile devices with the computer interface on which the enrollment application is accessible includes:
launch of an app clip associated with the enrollment application that directs a user to an enrollment page is displayed responsive to a first operating system being loaded on the first mobile device;
launch of the enrollment application on which the enrollment page is displayed responsive to a second operating system and the enrollment application being loaded on the first mobile device; and
launch of an application distribution platform on which the enrollment application is available responsive to the second operating system being loaded on the first mobile device and the enrollment application not being loaded on the first mobile device.

15. The non-transitory computer-readable medium of claim 10, wherein the operations further comprise removing the enrollment application from the first device following enrollment of the first device in the mobile device management system.

16. The non-transitory computer-readable medium of claim 10, wherein the optical code is configured to interface with a local agent at the two or more mobile devices.

17. The non-transitory computer-readable medium of claim 10, wherein:
the members of the group have a common attribute; and
the common attribute includes an enterprise role, a security assignment, a privilege to particular information, use of a software application, or device access.

18. The non-transitory computer-readable medium of claim 10, wherein the set of functions include:
a use restriction related to a particular software;
an access restriction related to data; and
a privilege relative to a particular software.

* * * * *